United States Patent [19]
Shimazu et al.

[11] Patent Number: 5,526,905
[45] Date of Patent: Jun. 18, 1996

[54] BRAKE DISC ROTOR

[75] Inventors: Takashi Shimazu; Haruo Katagiri, both of Aichi-ken; Shigeru Sakamoto; Hidetoshi Shimizu, both of Shizuoka-ken; Akio Inatomi, Aichi-ken; Masashi Ishihara, Aichi-ken; Masayoshi Katagiri, Aichi-ken; Toru Shinoda, Aichi-ken, all of Japan

[73] Assignees: Kabushiki Kaisha Toyota Chuo Kenkyusho, Aichi-ken; Toyota Jidosha Kabushiki Kaisha; Aisin Takaoka Co., Ltd., both of Toyota, all of Japan

[21] Appl. No.: 404,141

[22] Filed: Mar. 9, 1995

Related U.S. Application Data

[63] Continuation of Ser. No. 121,890, Sep. 17, 1993, abandoned.

[30] Foreign Application Priority Data

Sep. 17, 1992 [JP] Japan .................................. 4-275116

[51] Int. Cl.$^6$ .................................................. F16D 65/12
[52] U.S. Cl. ............................ 188/218 XL; 188/264 AA
[58] Field of Search ...................... 188/218 XL, 218 A, 188/264 A, 264 AA

[56] References Cited

U.S. PATENT DOCUMENTS

| | | | |
|---|---|---|---|
| 2,358,134 | 9/1944 | Tack . | |
| 3,391,763 | 7/1968 | Severson | 188/264 AA |
| 4,083,435 | 4/1978 | Gallus et al. | 188/218 XL |
| 4,164,993 | 8/1979 | Kobelt | 188/218 XL |
| 4,379,501 | 4/1983 | Hagiwara et al. | 188/218 A |
| 4,712,656 | 12/1987 | Courtois | 188/218 XL |
| 4,865,167 | 9/1989 | Giorgetti et al. | 188/218 XL |
| 4,928,798 | 5/1990 | Watson et al. | 188/264 AA |
| 5,279,396 | 1/1994 | Estaque et al. | 188/218 XL |

FOREIGN PATENT DOCUMENTS

| | | | |
|---|---|---|---|
| 2557649 | 6/1977 | Germany | 188/218 XL |
| 3740311 | 6/1989 | Germany | 188/218 XL |
| 63-146237 | 9/1988 | Japan . | |
| 2024966 | 1/1980 | United Kingdom | 188/264 AA |
| 2060796 | 9/1980 | United Kingdom . | |
| 2144186 | 7/1983 | United Kingdom . | |

Primary Examiner—Matthew C. Graham
Attorney, Agent, or Firm—Oblon, Spivak, McClelland, Maier & Neustadt

[57] ABSTRACT

A brake disc rotor which includes sliding plates on the inside and outside which are in parallel with and separated from each other in the axial direction of an axle; a plurality of inner and outer partition walls radially arranged between the sliding plates; a plurality of passages radially formed between the inner and outer partition walls; a plurality of inlet and outlet openings for communicating the passages; and a plurality of connecting openings for communicating the mutually adjacent passages. The stream flowing from the inlet opening is formed along an upper wall of the inner partition walls and the stream is formed in a flow separation portion in the vicinity of a lower wall of the outer partition wall through the connecting openings.

36 Claims, 27 Drawing Sheets

BRAKE DISC ROTOR

This application is a Continuation of application Ser. No. 08/121,890, filed on Sep. 17, 1993, now abandoned.

BACKGROUND OF THE INVENTION

1. Field of the Invention

This invention relates to a brake disc rotor of a disc brake device used in a vehicle or the like.

2. Description of the Related Art

As shown in FIGS. 1 and 2, a brake disc rotor of the prior art includes a plurality of partition walls F formed only radially between disc-shaped sliding plates OP and IP to form inlet openings I, outlet openings O and radial passages H between the partition walls, respectively.

As is apparent from an oil film observation for analyzing the stream within each passage, the prior art brake disc rotor described above has some problems as mentioned in the following discussion. As shown in both of FIG. 3 showing the processed data according to a styrene particle tracer method and FIG. 4 showing a sketch of the stream based on the above description, the stream, which flows from the inlet opening I into the passage H at an approximate angle of 50° from the velocity triangle composed of the velocity components in the peripheral and radial directions in the inlet opening, generates separation in the thickness direction on the suction surface side from the inlet to the outlet of the partition walls F constituting fins F, to result in a stagnation Y in a large area at the lower portion of each partition wall within the passage H constituting a ventilation hole. Therefore, a main stream area MS becomes very narrow, while a quasi-secondary stream SS occurs due to the collision against the upper surface of each partition wall and a reversed stream RS from the external portion also occurs at the upper portion of the outlet opening.

As a result, the prior art brake disc rotor has disadvantages in that since the pressure loss of the stream is large due to the narrowness of the main stream area MS, the surface heat transfer coefficient in the passage area by cooling wind is lowered to result in an undesirable efficiency in blowing and cooling of the rotor, while since the cooling area is reduced, the total quantity of heat dissipation is decreased.

This fact is more remarkable when increasing the number of sheets of fins in order to enlarge the cooling area, and particularly, there is a disadvantage in that the cross section of the inlet portion becomes small and the inflow resistance is increased.

SUMMARY OF THE INVENTION

The present inventors analyzed various streams using the processed images by a tracer method as well as oil film observation photos as to the prior art brake disc rotor. As a result, the present inventors have perceived a technical idea of the present invention that if partition walls are divided into inner partition walls and outer partition walls to form the connecting openings which effectively act on the stream, the stream crossing across the partition walls and passing through the connecting openings is formed by taking advantage of the pressure difference between the pressure surface of the partition walls constituting fins and the suction surface thereof, so that the pressure is recovered to prevent the flow separation in the inlet portion, and the stagnation area Y on the suction surface side is narrowed to enlarge the main stream area MS.

As a result of repeating research and development, the present inventors have also perceived a technical idea of the present invention that the length and installation positions of the inner partition walls are adjusted to effectively feed the stream to the stagnation area on the lower side of the outer partition walls by allowing the stream passing through the connecting openings to have the directionality by the inner partition walls, so that the pressure on the suction surface side is recovered.

It is an object of the present invention to provide the stream flowing close to the lower portion of the outer partition walls by allowing the stream flowing from the inlet openings of a brake disc rotor to partially pass through the connecting openings along the upper portion of the inner partition walls.

Another object of the present invention is to improve (i.e. the lowering of) the heat transfer coefficient by the cooling wind on the ventilation hole surface, by decreasing the stagnation area in the ventilation hole to lessen the pressure loss of the stream.

A further object of the present invention is to improve the blowing and cooling efficiency of the rotor by effectively blowing and cooling by use of the inner and outer partition walls and connecting opening.

A still further object of the present invention is to increase the total quantity of heat dissipation by enlarging the cooling area.

A yet further object of the present invention is to use a single line for design and manufacture, to reduce the cost and to become remarkably easy from the viewpoint of management.

A yet further object of the present invention is to provide a brake disc rotor comprising inner partition walls having enough length to be brought into contact with the stream flowing from the inlet opening so as to form the stream flowing along the upper wall.

Another object of the present invention is to provide a brake disc rotor, comprising at least two disc-shaped sliding plates separately provided in the axle direction on the inside and outside of said brake disc rotor; a plurality of inner and outer partition walls radially arranged between said sliding plates; a plurality of passages radially formed between said plurality of inner and outer partition walls; a plurality of inlet and outlet openings respectively provided in the inner and outer walls of the rotor, communicating to a plurality of inner and outer passages and opening inward and outward in the radial direction; and a plurality of connecting openings for allowing the mutually adjacent passages to communicate to each other between the inner and outer partition walls; wherein said inner partition walls are arranged inward from said connecting openings such that the stream flowing from said inlet opening is allowed to flow along an upper wall; and said outer partition walls are arranged such that the stream flowing along said inner partition walls is allowed to partially flow into the mutually adjacent passages on the downstream side through said connecting openings to form the stream in a flow separation portion in the vicinity of a lower wall.

A further object of the present invention is to provide a brake disc rotor in which the length of said inner partition wall is determined in accordance with an inflow angle of the stream flowing from said inlet opening.

A still further object of the present invention is to provide a brake disc rotor, in which the outer end of said inner partition wall is arranged on the more outer side from said inlet opening than the length determined by a ratio w/tanα of a width W of said inlet opening to an inflow angle α of the stream flowing from said inlet opening.

A yet further object of the present invention is to provide a brake disc rotor, the connecting opening is formed at the position on the more outer side from said inlet opening than the length determined by a ratio w/tanα of a width W of said inlet opening to an inflow angle of the stream flowing from said inlet opening.

A yet further object of the present invention is to provide a brake disc rotor, wherein the connecting opening is formed in the range of 0.2 L to 0.7 L from the inner end of said inner partition wall, when the difference between the radius of the inner end of said inner partition wall and the radius of the outer end of said outer partition wall is defined as L.

Another object of the present invention is to provide a brake disc rotor, in which the inner partition wall is arranged between the mutually adjacent outer partition walls.

A further object of the present invention is to provide a brake disc rotor, in which the inner and outer partition walls are formed along the straight line.

A still further object of the present invention is to provide a brake disc rotor, in which the inner and outer partition walls are arranged in the radial direction of the disc rotor.

A yet further object of the present invention is to provide a brake disc rotor, in which the inner partition wall is inclined at an angle smaller than the inflow angle of the stream with respect to the radial direction of the disc rotor.

A yet further object of the present invention is to provide a brake disc rotor, in which the outer end of said inner partition wall is close to the outer side from the inner end of said outer partition wall.

Another object of the present invention is to provide a brake disc rotor, in which the connecting opening is formed so as to be in the range of 0.1 L to 0.7 L from the inner end of said inner partition wall, when the difference between the radius of the inner end of said inner partition wall and the radius of the outer end of said outer partition wall is defined as L.

A further object of the present invention is to provide a brake disc rotor, in which either of said inner and outer partition walls is arranged at the symmetrical position relative to the other adjacent partition wall.

A still further object of the present invention is to provide a brake disc rotor, in which the installation angle of said inner partition wall is different from that of said outer partition wall.

A yet further object of the present invention is to provide a brake disc rotor, in which the outer partition wall is arranged to be inclined at an angle smaller than the inflow angle of the stream in the radial direction of the disc rotor.

A yet further object of the present invention is to provide a brake disc rotor, in which the outer partition wall is inclined to the stream side after rotation.

Since the stream is formed by allowing the stream flowing close to the inner partition walls, out of the streams flowing from the inlet openings, to partially flow in toward the suction surface of the lower portion of the outer partition walls through the connecting openings formed between the inner and outer partition walls arranged alternately, the brake disc rotor of the present invention exerts such an effect as to narrow the stagnation area due to the flow separation on the suction surface side, and to enlarge the main stream area.

Since the stream is formed by allowing the stream flowing close to the inner partition walls, out of the streams flowing from the inlet openings, to partially flow in toward the suction surface of the lower portion of the outer partition walls which are arranged in the radial direction through the connecting openings formed between the inner and outer partition walls arranged alternately in the radial direction, the brake disc rotor of the present invention exerts such an effect as to narrow the stagnation area due to the flow separation on the suction surface side, and to enlarge the main stream area.

Since the stream having a small angle relative to the partition walls is formed by allowing the stream flowing close to the inner partition walls, out of the streams flowing from the inlet openings, to partially flow in toward the suction surface of the lower portion of the outer partition walls which are arranged to be inclined in the radial direction through the connecting openings formed between the inner and outer partition walls arranged alternately to be inclined at an angle not more than an inflow angle of the stream with respect to the radial direction, the brake disc rotor of the present invention exerts such an effect as to narrow the stagnation area due to the flow separation on the suction surface side, and to enlarge the main stream area.

Since the stream is formed by allowing the stream flowing close to the inner partition walls, out of the streams flowing from the inlet openings, to partially flow in toward the suction surface of the lower portion of the outer partition walls through the connecting openings formed between the inner and outer partition walls arranged alternately and different from each other in number, the brake disc rotor of the present invention exerts such an effect as to narrow the stagnation area due to the flow separation on the suction surface side, and to enlarge the main stream area.

Since the stream is formed by allowing the stream flowing close to the inner partition walls, out of the streams flowing from the inlet openings, to partially flow in toward the suction surface of the lower portion of the outer partition walls through the connecting openings formed between the inner and outer partition walls arranged alternately at the symmetrical position, the brake disc rotor of the present invention exerts such an effect as to narrow the stagnation area due to the flow separation on the suction surface side, and to enlarge the main stream area.

Since the stream is formed by allowing the stream flowing close to the inner partition walls, out of the streams flowing from the inlet openings, to partially flow in toward the suction surface of the lower portion of the outer partition walls through the connecting openings formed between the inner and outer partition walls which are arranged alternately, and at a positions within the range of 10 to 70% of the length from the inner end of the inner partition walls to the outer end of the outer partition walls, the brake disc rotor of the present invention exerts such an effect as to narrow the stagnation area due to the flow separation on the suction surface side, and to enlarge the main stream area.

Since the stream is formed by allowing the stream flowing close to the inner partition walls, out of the streams flowing from the inlet openings, to partially flow in toward the suction surface of the lower portion of the outer partition walls through the connecting openings formed between the inner and outer partition walls arranged alternately at different angles, the brake disc rotor of the present invention exerts such an effect as to narrow the stagnation area due to the flow separation on the suction surface side, and to enlarge the main stream area.

Since a chamfered portion is formed on the end of the inner wall of a sliding plate on the inside, and a projection portion is formed on the end of the inner wall of a sliding plate on the outside, the brake disc rotor of the present invention exerts such an effect as to smoothly change the flowing direction of the stream in the inlet openings.

Since small projections constituting heat dissipation fins are formed within the passage at the positions where the stream is swift, the brake disc rotor of the present invention exerts a fin action as well as such an effect as to enlarge the heat dissipation area.

Since the angle between the partition walls and the stream flowing at a certain inflow angle is comparatively smaller than that of the prior art, and thus the stream flows along the partition walls, the brake disc rotor of the present invention exerts such an effect as to prevent the flow separation from being produced in the inlet openings of the inner portion. Further, since the stream is formed by allowing the stream flowing close to the partition walls, out of the streams flowing from the inlet openings, to partially flow in toward the suction surface of the lower portion of the partition walls through the connecting openings, the brake disc rotor also exerts such an effect as to control the reverse stream in the outlet openings, as well as to narrow the stagnation area by preventing the flow separation on the suction surface side, and to enlarge the main stream area.

Since the outer portion of the partition walls is inclined to the stream side after rotation, and thus the stream passing through the connecting openings flows along the outer partition walls, the brake disc rotor of the present invention exerts such an effect as to enlarge the main stream area even in the outer portion of the partition walls by narrowing the stagnation area by effectively preventing the flow separation on the suction surface side.

Since the main stream area is enlarged within the passages, the brake disc rotor of the present invention exerts such an effect as to improve the blowing and cooling efficiency of the rotor, and to increase the total quantity of heat dissipation for expanding the cooling area by reducing the pressure loss of the stream and by lessening the lowering of the heat transfer coefficient by the surface of cooling wind.

Since the main stream area is enlarged within the passages formed by the partition walls arranged in the radial direction, the brake disc rotor of the present invention exerts such an effect as to improve the blowing and cooling efficiency of the rotor, and to increase the total quantity of heat dissipation for expanding the cooling area by reducing the pressure loss of the stream and by lessening the lowering of the heat transfer coefficient by the surface of cooling wind.

Since the relative angle is small between the partition walls and the stream within the passages formed by the partition walls arranged to be inclined in the radial direction, and thus the main stream area is further enlarged, the brake disc rotor of the present invention exerts such an effect as to improve the blowing and cooling efficiency of the rotor, and to increase the total quantity of heat dissipation for expanding the cooling area by reducing the pressure loss of the stream and by lessening the lowering of the heat transfer coefficient by the surface of cooling wind.

Since the main stream area is enlarged within the passages formed by the outer partition walls different in number from the inner partition walls, and the resistance of the stream is reduced within the passages formed by the partition walls which are smaller in number, the brake disc rotor of the present invention exerts such an effect as to improve the blowing and cooling efficiency of the rotor, and to increase the total quantity of heat dissipation for expanding the cooling area by reducing the pressure loss of the stream and by lessening the lowering of the heat transfer coefficient by the surface of cooling wind.

Since the main stream area is enlarged within the passages formed by the partition walls arranged symmetrically, the brake disc rotor of the present invention exerts such an effect as to make the brake disc rotor applicable to both left and right wheels of a vehicle, as well as to improve the blowing and cooling efficiency of the rotor, and to increase the total quantity of heat dissipation for expanding the cooling area, by reducing the pressure loss of the stream and by lessening the lowering of the heat transfer coefficient by the surface of cooling wind.

Since the main stream area is enlarged within the passages by leading the stream to the passages on the downstream side through the connecting openings provided at the above-mentioned appropriate positions between the inner and outer partition walls, the brake disc rotor of the present invention exerts such an effect as to improve the blowing and cooling efficiency of the rotor, and to increase the total quantity of heat dissipation for expanding the cooling area by effectively reducing the pressure loss of the stream and by lessening the lowering of the heat transfer coefficient by the surface of cooling wind.

Since the main stream area is enlarged within the passages formed by the outer partition walls arranged at the optimum angle different from that of the inner partition walls, the brake disc rotor of the present invention exerts such an effect as to improve the blowing and cooling efficiency of the rotor, and to increase the total quantity of heat dissipation for expanding the cooling area by further reducing the pressure loss of the stream and by lessening the lowering of the heat transfer coefficient by the surface of cooling wind.

Since the main stream area is enlarged within the passages and the reverse stream in the outlet openings is controlled by the inner portion of the inclined partition walls and the connecting openings, the brake disc rotor of the present invention exerts such an effect as to improve the blowing and cooling efficiency of the rotor, and to increase the total quantity of heat dissipation for expanding the cooling area by reducing the pressure loss of the stream and by lessening the lowering of the heat transfer coefficient by the surface of cooling wind.

Since the outer portion of the partition walls is inclined to the stream side after rotation, the brake disc rotor of the present invention exerts such an effect as to improve the blowing and cooling efficiency of the rotor more than that of the rotor, and to increase the total quantity of heat dissipation for expanding the effective cooling area by preventing the flow separation to further enlarge the main stream area within the passages and by controlling the reverse stream in the outlet openings.

BRIEF DESCRIPTION OF THE DRAWINGS

The foregoing and other objects and features of the invention will become apparent from the following description of preferred embodiments of the invention with reference to the accompanying drawings, in which.

DESCRIPTION OF THE PREFERRED EMBODIMENTS

Figure 10:
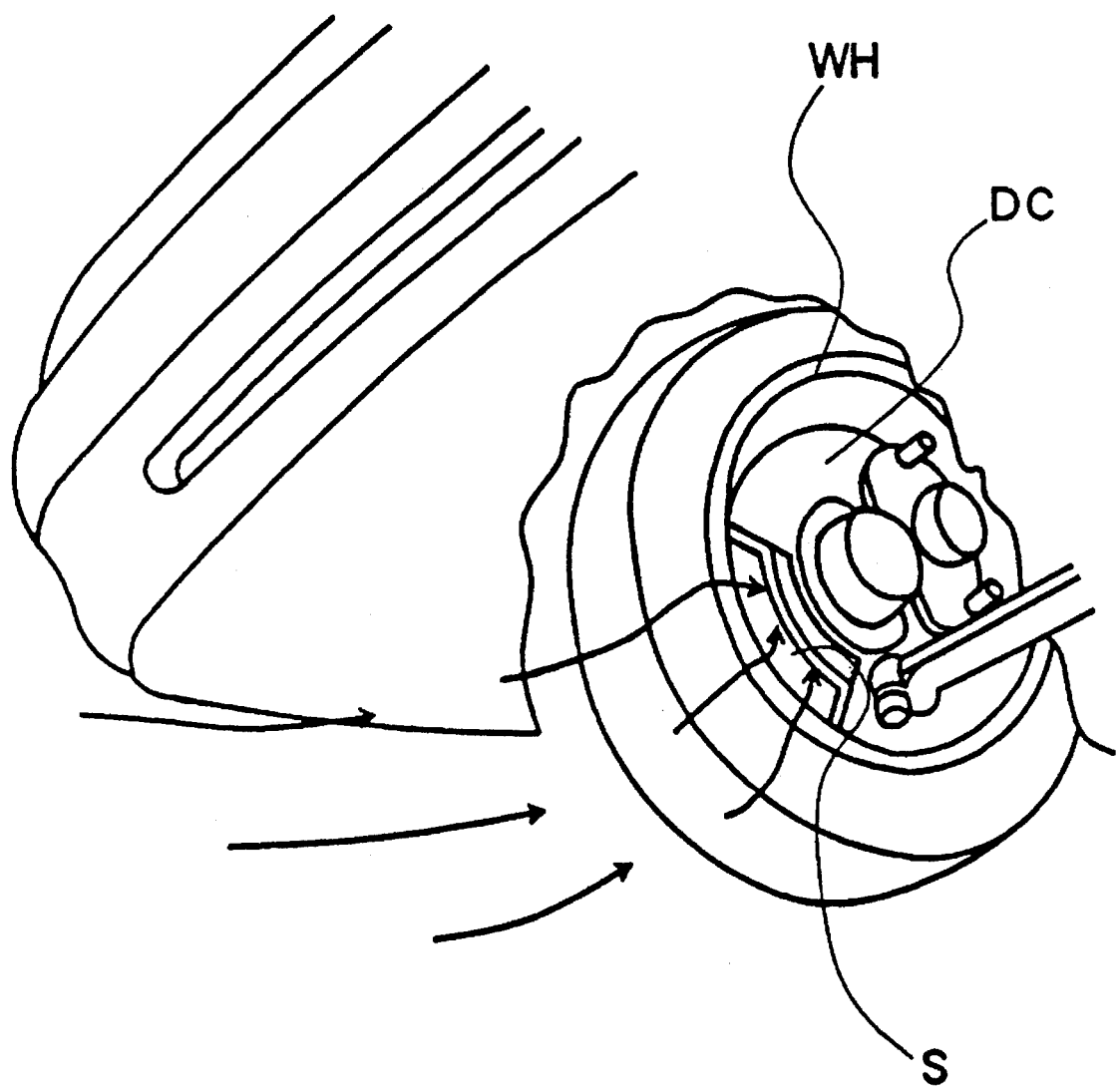
FIG. 10 is a perspective view, partly broken-away, showing a condition that the brake disc rotor as the first preferred embodiment of the present invention is loaded on a vehicle.
Figure 11:
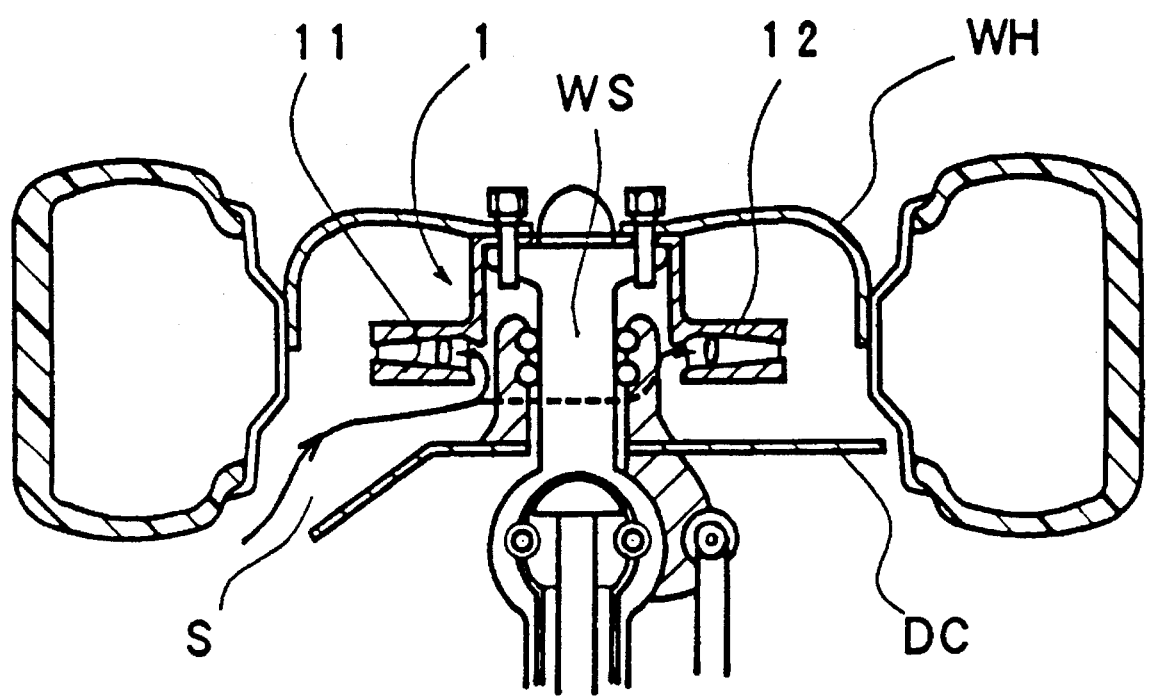
FIG. 11 is a sectional view showing a condition that the brake disc rotor as the first preferred embodiment of the present invention is mounted on a wheel.

A brake disc rotor as a first preferred embodiment is applied to a disc brake device for use in an automobile and introduces air, which is sucked from a suction port S of a dust cover DC mounted on the inside of each wheel WH, into a ventilation hole of a rotor as shown in FIGS. 10 and 11. With reference to FIGS. 5 through 11, details of the brake disc rotor will be given in the following discussion.

A brake disc rotor 1 as the first preferred embodiment comprises: sliding plates 11 and 12 on the inside and outside wherein both are provided parallel to and separate from each other in the axial direction of an axle (not shown); a plurality of fins 2 composed of mutually adjacent outer partition walls 22 provided radially between the sliding plates 11 and 12 and arranged in the radial direction and inner partition walls 21 provided radially at the intermediate portion between the mutually adjacent outer partition walls and arranged in the radial direction; a plurality of openings 31 and 32 opening inward and outward in the radial direction between the sliding plates 11 and 12; a plurality of ventilation holes 4 composed of passages 41a and 42a formed by the sliding plates 11 and 12 and the mutually adjacent inner and outer partition walls 21 and 22; connecting openings 5 formed between the inner and outer partition walls 21 and 22 which are arranged alternately, and for allowing the mutually adjacent ventilation holes to communicate to each other; an R-portion 61 constituting a chamfered portion on the end of the inner wall of the inside sliding plate; a direction converting portion 62 constituting a projection portion on the end of the outside sliding plate; and heat dissipating fins 7 arranged radially on the inner wall constituting each ventilation hole 4 of the inside and outside sliding plates.

Figure 6:
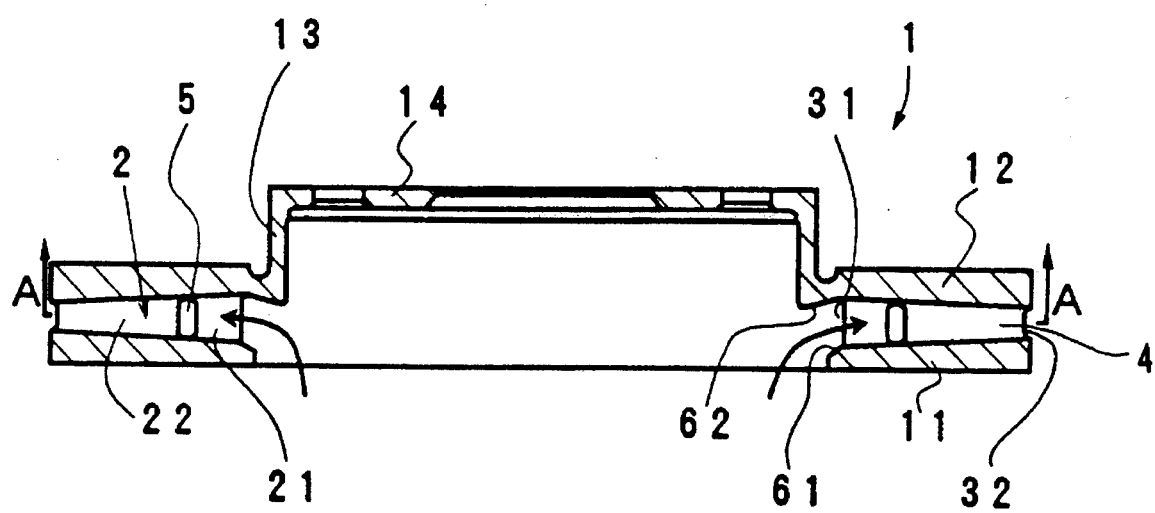
FIG. 6 is a longitudinal-sectional view showing the brake disc rotor as the first preferred embodiment of the present invention.

The outside sliding plate 12 is provided integrally with a boss portion 14 having a hole for fixation through a step portion 13 together with the inside sliding plate 11, as shown in FIG. 6. The inside and outside plates 11 and 12 linearly increase in thickness accordingly as both the sliding plates expand outward in the radial direction to result in linearly reducing the height of the ventilation hole 4.

Figure 1:
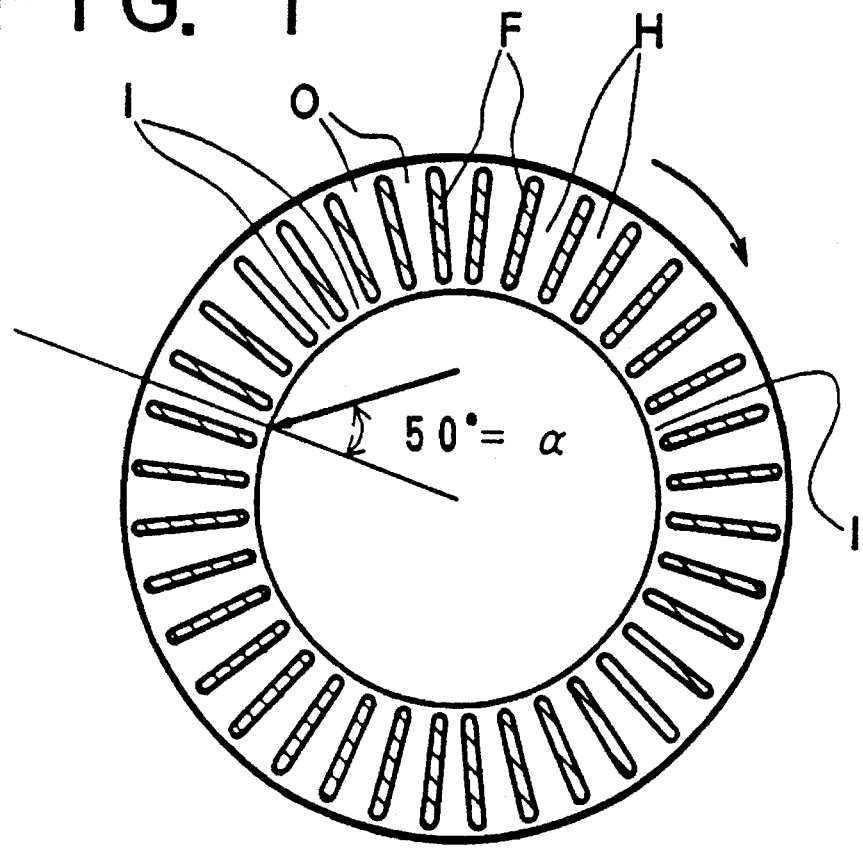
FIG. 1 is a cross-sectional view showing a prior art brake disc rotor and taken along line B—B in FIG. 2.
Figure 2:
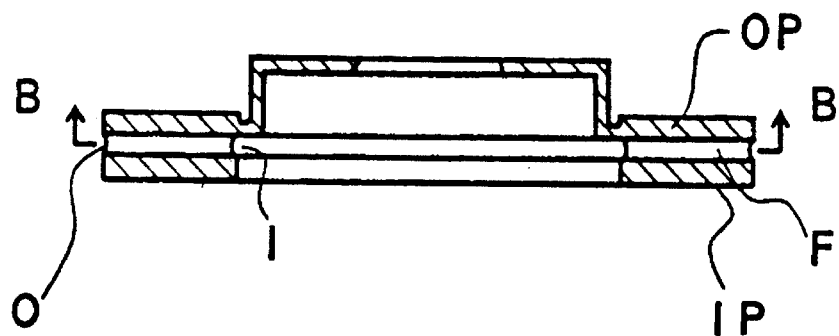
FIG. 2 is a longitudinal-sectional view showing the prior art brake disc rotor.
Figure 3:
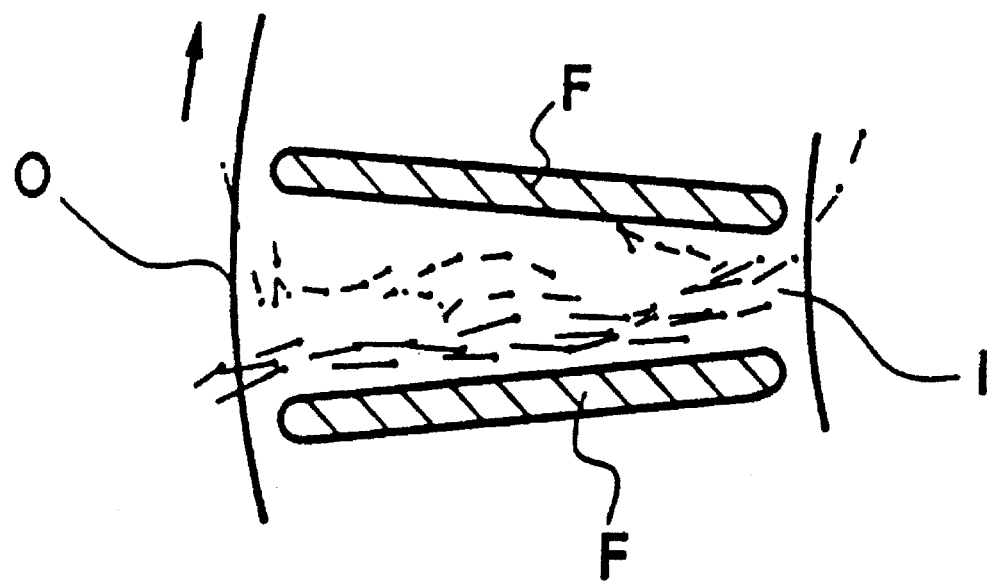
FIG. 3 is a fragmentary sectional view showing a stream within the prior art brake disc rotor by tracer particle process data.
Figure 4:
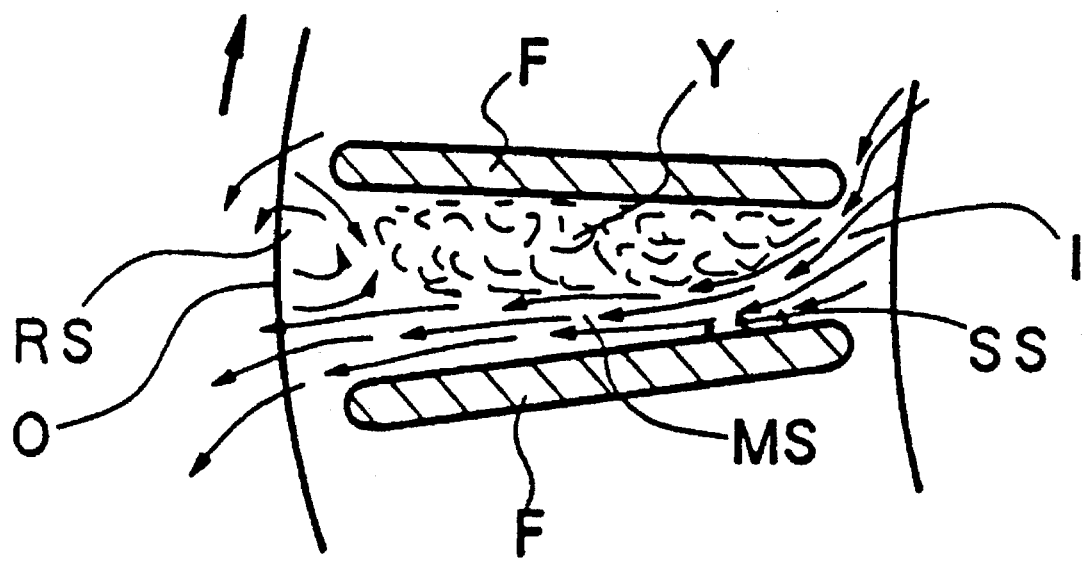
FIG. 4 is a fragmentary sectional view showing a stream within the prior art brake disc rotor.
Figure 5:
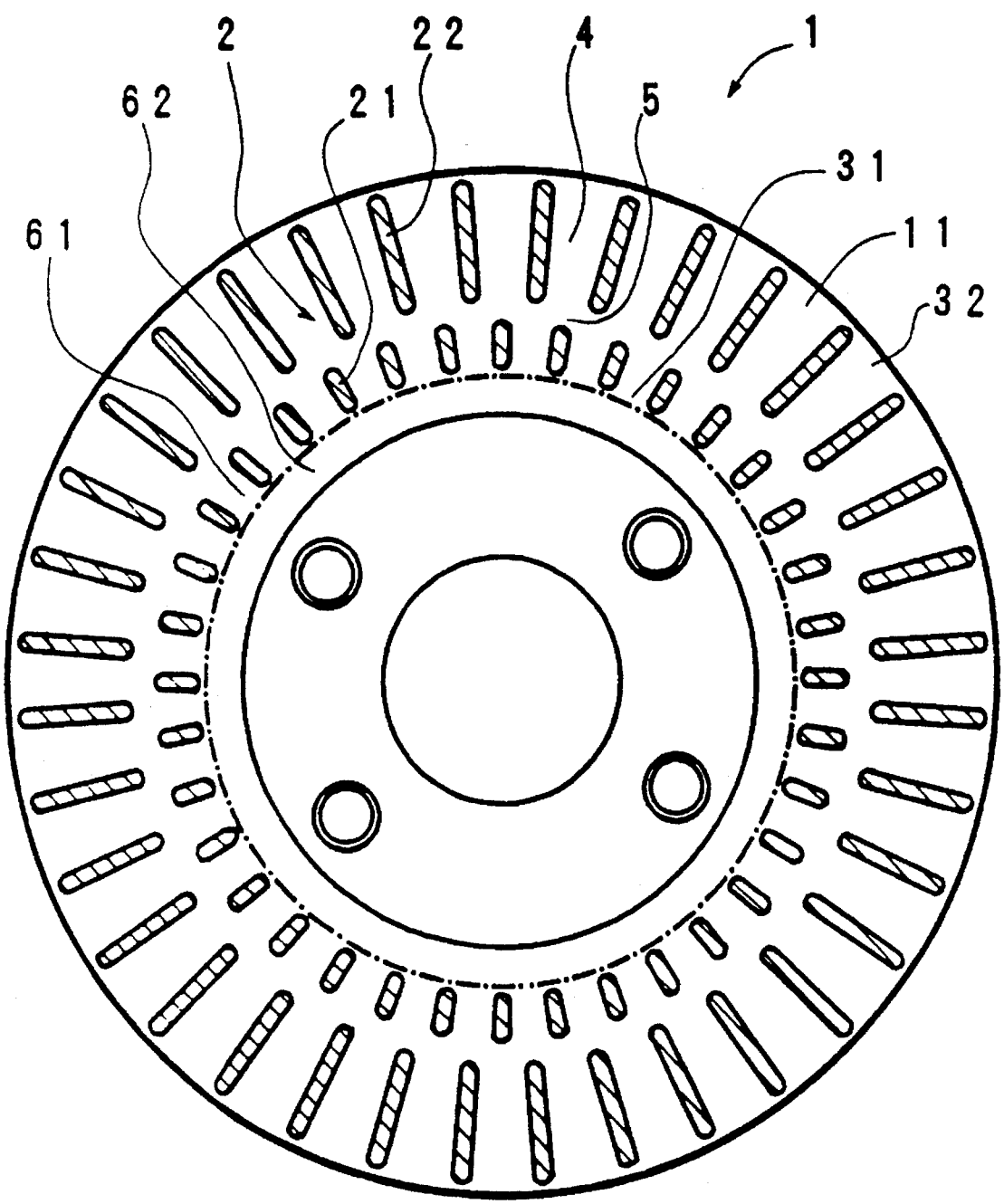
FIG. 5 is a cross-sectional view showing a brake disc rotor as a first preferred embodiment of the present invention and taken along line A—A in FIG. 6.
Figure 7:
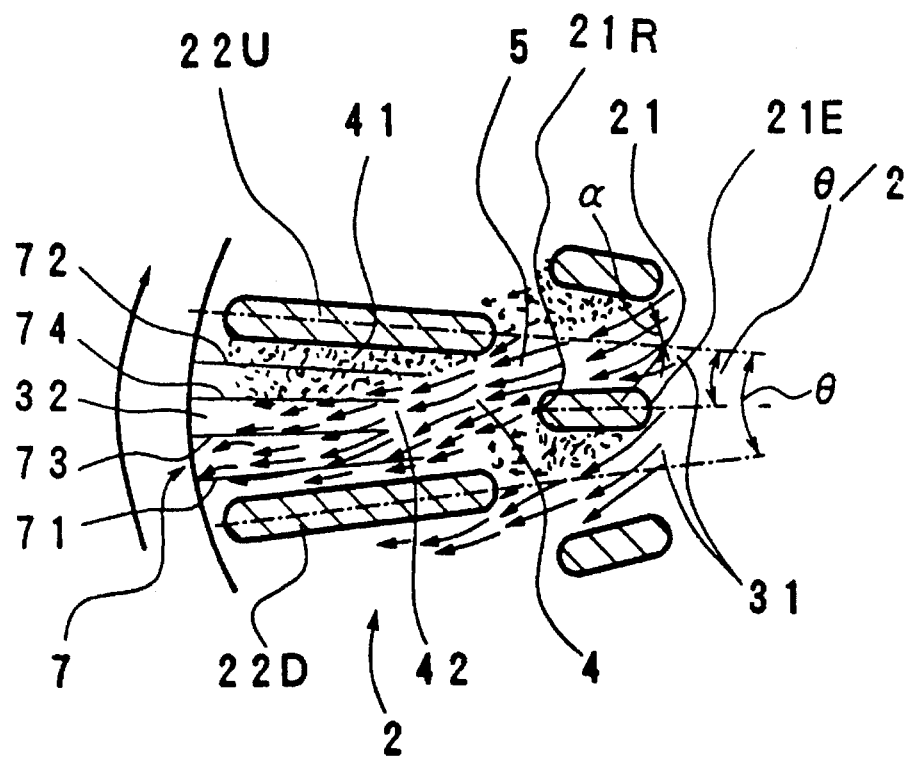
FIG. 7 is a fragmentary cross-sectional view showing a stream within the brake disc rotor as the first preferred embodiment of the present invention.
Figure 9:
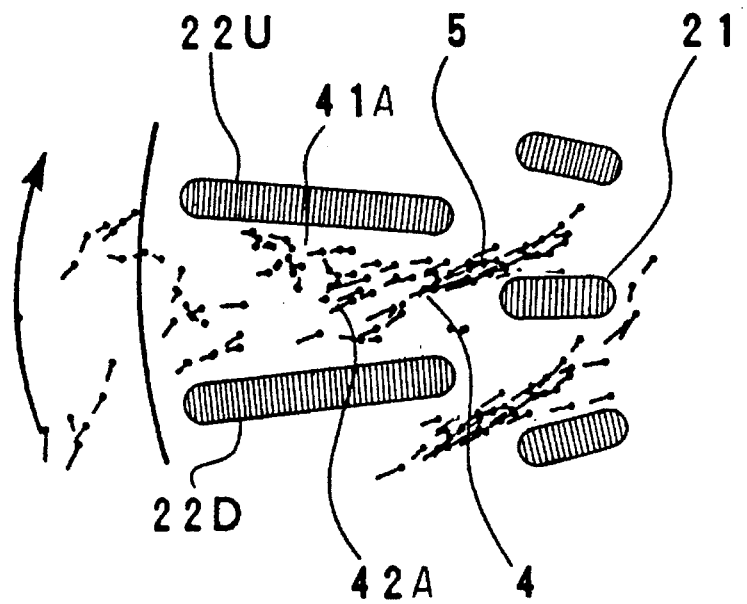
FIG. 9 is a fragmentary sectional view showing a stream within the brake disc rotor as the first preferred embodiment of the present invention by tracer particle process data.

As shown in FIGS. 5 and 7, the fins 2 are composed of the inner partition walls 21 and the outer partition walls 22, both of which are 4.5 mm in thickness, provided radially between the inside and outside sliding plates 11 and 12 in the range of 165 mm to 275 mm in diameter, arranged in the radial direction and integrally molded with the inside and outside sliding plates 11 and 12. The inner partition walls 21 are arranged in the radial direction and provided on the inner side at an angle of $\theta/2$ at the symmetrical position relative to the outer partition walls 22 mutually adjacent to each other at an angle of $\theta$.

As shown in FIG. 6, the ventilation hole 4 is linearly enlarged accordingly as the thickness of each of the inside and outside sliding plates 11 and 12 is increased outward in the radial direction. The height of the ventilation hole 4 is 14 mm at an inlet opening 31, and 9 mm at an outlet opening 32. Since the inner partition walls 21 and the outer partition walls 22 both constituting the fins 2 are formed radially in an alternate manner, the section area of each of the inner and outer ventilation holes 41 and 42 is made approximately uniform.

As shown in FIG. 7, the connecting opening 5 is 7 mm in length (i.e., the projected length of the inner partition wall 21 and the outer partition wall 22 on a same line) and divides the fin 2 into the inner partition wall 21 and the outer partition wall 22. The connecting opening 5 is arranged such that a line connecting the end 21E of the inner partition wall 21 of the fin 2 on the upstream side of the stream and the end of the connecting opening 5 (i.e., the rear end 21R of the inner partition wall 21 of the fin 2) has an angle of a approximately 50° relative to a neutral line N of the ventilation hole 4, namely the connecting opening 5 is formed at a position in the range of 0.24 L to 0.38 L (i.e., L represents the length of the difference between the radius of the rotor at the radially inner end of the inner partition wall 21 of the fin 2 and the radius of the rotor at the rear or radially outer end of the outer partition wall 22) from the inner end of the fin 2. As shown in FIG. 7, the inner wall 21 is entirely positioned in a region located between the extensions of two longitudinal axes, respectively, of the two adjacent outer walls.

The permissible installation position of the connecting opening 5 is in the range of 0.1 L (i.e., 70° as the above-mentioned angle) to 0.7 L (30°), although it depends on the inflow angle of the air stream into the ventilation hole 4. However, in the case where the installation position is too close to the inlet opening 31 (i.e., 0.1 L or less), the length of the inner partition wall 21 is short, and the stream flowing at an inflow angle $\alpha$ of 40° through 50° directly passes through the connecting opening 5. As a result, some flow separation and the stagnation area Y are generated on the suction surface of the outer partition wall 22 in the ventilation hole on the adjacent downstream side, thereby enlarging the inflow loss at the inlet portion and decreasing the flow quantity, which leads to the lowering of cooling capacity.

On the other hand, in the case where the installation position of the connecting opening 5 is too close to the outlet opening 32 (i.e., 0.7 L or more), the generation of the flow separation on the outer side is controlled to lessen the stagnation area. However, since the pressure difference is decreased due to the loss resulting from the expansion of the ventilation hole 4, the pressure recovery effect is lessened, the flow separation is generated at the inlet portion, and the stagnation area is formed on the suction surface side of the inner fin, whereby flow quantity and cooling capacity are lowered. In the case where the installation position is apart by 0.5 L or more, the length of the outer fin becomes short. Accordingly, the difference between the inner energy and the outer energy of the hole for defining the blowing capacity of the ventilation hole becomes small, and the passing flow quantity has a tendency to decrease. As a result, the limit of the installation position is set as 0.7 L from the standpoint of the balance between the installation position and the pressure recovery effect (i.e., effect to increase the flow quantity) caused by the connecting opening 5.

In the case where a sufficient cooling effect is required, it is preferable to make the installation position of the connecting opening 0.2 L to 0.5 L as a desirable range, although it depends on the installation interval and revolving speed of the fins. In the first preferred embodiment, the installation position of the connecting opening is set in the range of 0.24 L to 0.39 L.

The permissible length of the connecting opening 5 is in the range of 2 mm to 15 mm as a projected length described above. However, when the length of the connecting opening is short, the effect of the connecting opening as a pressure recovery port is lowered. On the other hand, when the length thereof is long, the length of the fin becomes short, and thus the effect of the connecting opening as a blade (blowing fan) is lowered. As a result, the optimum length of the connecting opening is set in the range of 4 mm to 6 mm. In the first preferred embodiment, the length of the connecting opening is set as 6 mm in consideration of the viewpoint of manufacture.

The R-portion 61 at the end of the inner wall of the inside sliding plate 11 has a corner portion chamfered at an angle of 45°, as shown in FIG. 6, and the portion with the minimum thickness is set as 5 mm from the viewpoint of strength.

The direction converting portion 62 of the outside sliding plate 12 is projected inward in the radial direction from the inside sliding plate 11, and gradually increases in thickness according as the inner wall comes inward, to be formed into a concave arc-like shape which is curved up by 4 mm as shown in FIG. 6. As a result, the direction converting portion 62 transforms the stream in the axial direction of the rotor 1 into the stream outward in the radial direction, and allows the stream into the ventilation hole 4 through the inlet opening 31 in cooperation with the R-portion 61.

Figure 8:
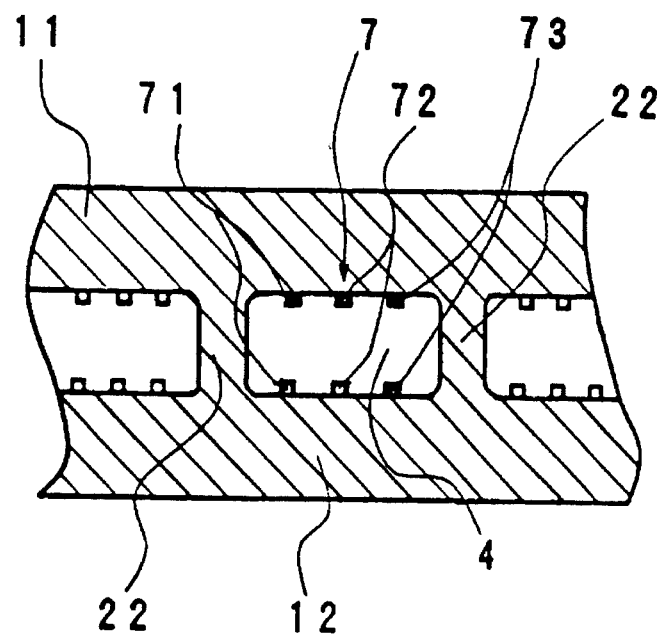
FIG. 8 is a sectional view showing a heat dissipation fin within a ventilation hole as the first preferred embodiment of the present invention.

The heat dissipating fins 7 have long heat dissipating fins 71 and 72 radially integrated on a portion close to the outer partition wall 22 and short heat dissipating fins 73 and 74 radially integrated on a center portion of the ventilation hole 4, as shown in FIGS. 7 and 8, whereby the heat dissipation effect is enhanced without increasing the resistance of the stream within the ventilation hole 4.

The overall operation of the first preferred embodiment is as follows.

The brake disc rotor of the first preferred embodiment described above smoothly transforms the axial stream into the radial stream in cooperation with the R-portion 61 and the direction converting portion 62 in the inlet opening 31, as shown in FIG. 6, which allows the stream to flow into the ventilation hole 4 at the inflow angle of 40° to 50° through the inlet opening 31, as shown in FIG. 7, and allows the stream flowing along the wall surface on the pressure surface side of the inner partition wall 21 arranged on the intermediate portion of the fin 2 to smoothly flow into the subsequent ventilation hole 4 which is constituted by the outer partition walls 22U and 22D, through the connecting opening 5. As a result, the generation of the flow separation is controlled on the suction surface side of the outer partition walls 22 of the fins 2, and the stagnation area 41a is narrowed to form a wide main stream area 42a. This fact is apparent from FIG. 9 which shows sketch data of tracer particle process data by a styrene particle tracer method for making the stream visible that traces flowing styrene particles which follow the stream at the time when the disc rotor is revolved at 2500 r.p.m. corresponding to the vehicle speed of 250 Km/h. In this styrene tracer particle method, it is possible to obtain a velocity vector at a local place by determining each correspondence of the floating particle position continuously incorporated, and the results thus obtained well correspond to air-speed measurement data, and accordingly this is suitable to an observation of a main stream.

In the brake disc rotor of the first preferred embodiment having the operation described above, the inner and outer partition walls 21 and 22 are arranged alternately, and the stream flowing from the inlet openings 31 is bent by the inner partition walls 21 to the suction surface side of the partition wall 22U on the slightly outer side to form the smooth stream. Since the connecting opening 5 formed between the inner and outer partition walls has a substantially large effective opening area to the stream, the connecting opening 5 effectively forms such a smooth stream since the connecting opening 5 hardly acts to restrict the stream passing through the connecting opening 5. Accordingly, the generation of the stagnation area 41a is controlled by preventing flow separation on the suction surface side of the outer partition walls 22 of the fins 2, and a wide main stream area 42a is formed in the most desirable form by controlling the generation of a prior art quasisecondary stream, so that the reverse stream produced in the outlet opening as in the case of the prior art can also be controlled. As a result, the brake disc rotor exerts such an effect as to improve the blowing and cooling efficiency of the rotor 1 and to increase the total quantity of heat dissipation for expanding the effective cooling area by minimizing the pressure loss of the stream and by lessening the lowering of the heat transfer coefficient by the surface of cooling wind.

Namely, the cooling capacity as a quantity of heat dissipation is expressed by a product of a heat dissipation area, a heat transfer coefficient and a temperature difference to one another, and in the case of a heat transfer by forced convection, the heat transfer coefficient is in proportion to the power of 0.5 through 0.8 of the flow rate. Therefore, the increase in flow rate is essential to the improvement of the cooling capacity. In other words, since the first preferred embodiment can decrease the passage resistance and increase the flow rate, the quantity of heat dissipation and the cooling capacity are improved by approximately 11%.

Further, since the cooling capacity is in proportion to the heat dissipation area, it is important to increase the cooling area. In the first preferred embodiment, since the cooling area is effectively secured within the limited cooling area to enlarge an area having high heat transfer coefficient, the cooling capacity can be enhanced remarkably.

Furthermore, since the axial stream is transformed smoothly into the radial stream in cooperation with the R-portion 61 and the direction converting portion 62 in the inlet opening 31, as shown in FIG. 6, the brake disc rotor 1 of the first preferred embodiment exerts such an effect as to effectively control the flow separation of the stream produced in the vicinity of the end of the inner wall of the inside sliding plate 11.

Since four pieces of small heat dissipating fins 71 through 74 are formed on the inner wall on the outer side of the inside and outside sliding plates, as shown in FIGS. 7 and 8, the brake disc rotor 1 of the first preferred embodiment exerts such an effect as to effectively enhance the heat dissipation effect without increasing the resistance of the stream within the ventilation hole 4.

Since the fins 2 are formed radially and constituted in a symmetrical form as shown in FIG. 5 to allow brakes for left and right wheels of an automobile to be constituted by a same rotor, the brake disc rotor 1 of the first preferred embodiment exerts such an effect as to use a single line for design and manufacture, to reduce the cost and to become remarkably easy from the viewpoint of management.

Since the length of the connecting opening 5 is set as 6 mm as the optimum length, the brake disc rotor 1 of the first preferred embodiment exerts such an effect as to most effectively control the stagnation due to the flow separation on the suction surface side of the fins 2 by the stream passing through the connecting opening 5.

Moreover, since the connecting opening 5 is arranged at a position in the range of 0.24 L (i.e., 50° as the abovementioned angle) to 0.39 L as the most appropriate position, the brake disc rotor 1 of the first preferred embodiment exerts such an effect as to most effectively control the stagnation due to the flow separation.

Figure 12:
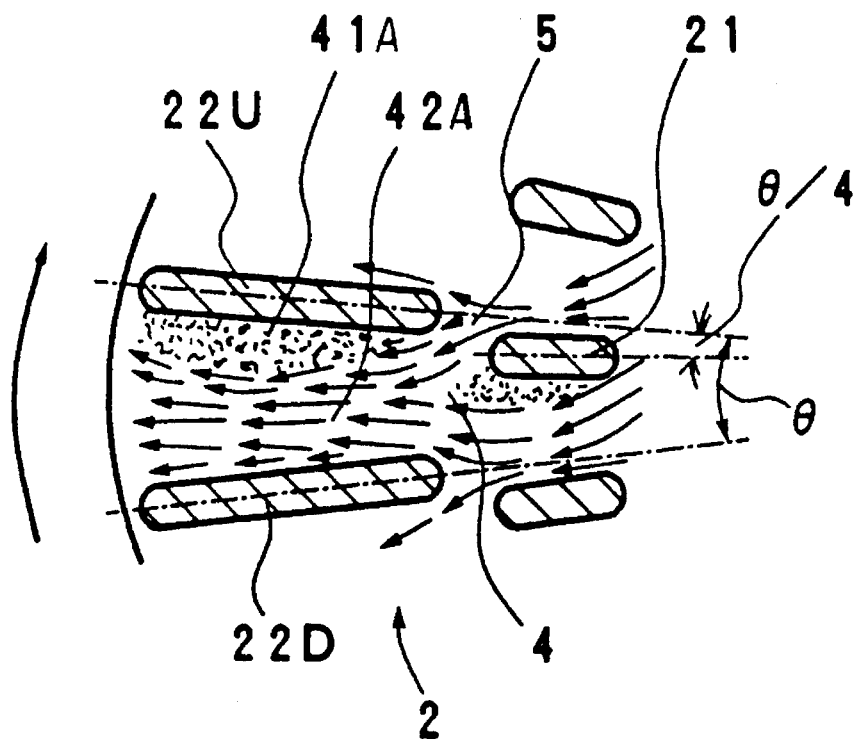
FIG. 12 is a fragmentary sectional view showing a brake disc rotor and a stream as a second preferred embodiment of the present invention.
Figure 13:
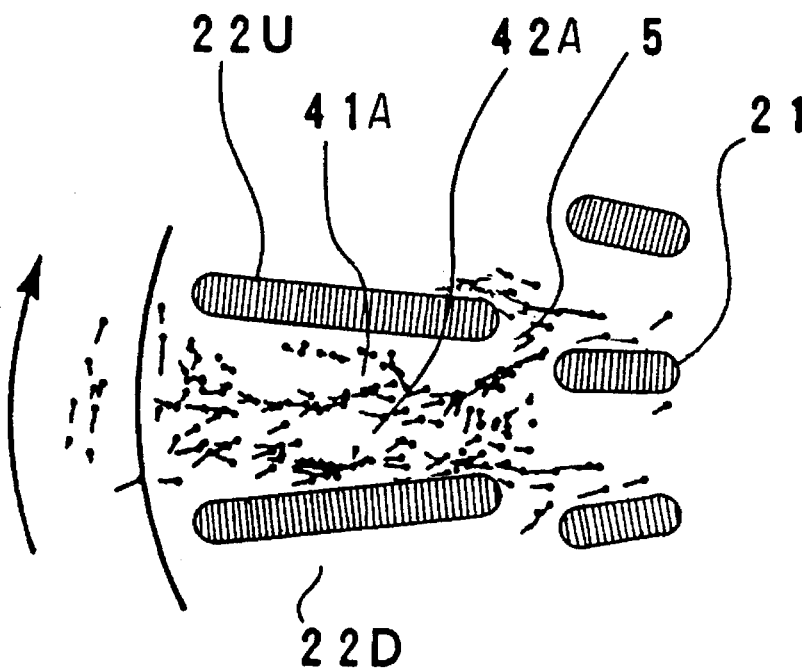
FIG. 13 is a fragmentary sectional view showing a stream within the brake disc rotor as the second preferred embodiment of the present invention by tracer particle process data.

A brake disc rotor of a second preferred embodiment of the present invention is constituted such that the inner partition walls 21 are arranged at a position where a phase is shifted behind by θ/4 relative to the outer partition wall 22U on the upstream side of the stream and ahead by 3θ/4 relative to the outer partition wall 22D on the downstream side of the stream, as shown in FIGS. 12 and 13, differently from the brake disc rotor of the first preferred embodiment in which the inner partition walls 21 are arranged by shifting the phase by θ/2 relative to the outer partition walls 22 in order to obtain the merit of a symmetrical form to both left and right sides. The angle θ is formed by the respective longitudinal axes of two adjacent outer partition walls in relation to the center of the rotor as a standard, as shown in FIGS. 7, 12, 14.

Although the brake disc rotor of the second preferred embodiment having the constitution described above sacrifices the merits of the symmetrical form to both left and right sides in the first preferred embodiment, the interval between the inner and outer partition walls 21 and 22U is shorter than that in case of the first preferred embodiment, so that the stream is formed close to the suction surface of the outer partition wall 22U, as apparent from FIGS. 12 and 13. Accordingly, the generation of the flow separation on the suction surface side of the outer partition walls 22 is prevented to further narrow the stagnation area 41. Further, since the stream flowing close to the suction surface of the outer partition wall 22U merges into the stream flowing between the outer partition wall 22D and the inner partition wall 21 on the underside in FIG. 12 within the ventilation hole composed of the outer partition walls 22U and 22D, a wide main stream area 42a is formed. As a result, the brake disc rotor of the second preferred embodiment exerts such an effect as to improve the blowing and cooling efficiency of the rotor 1 and to increase the total quantity of heat dissipation for expanding the effective cooling area.

Figure 14:
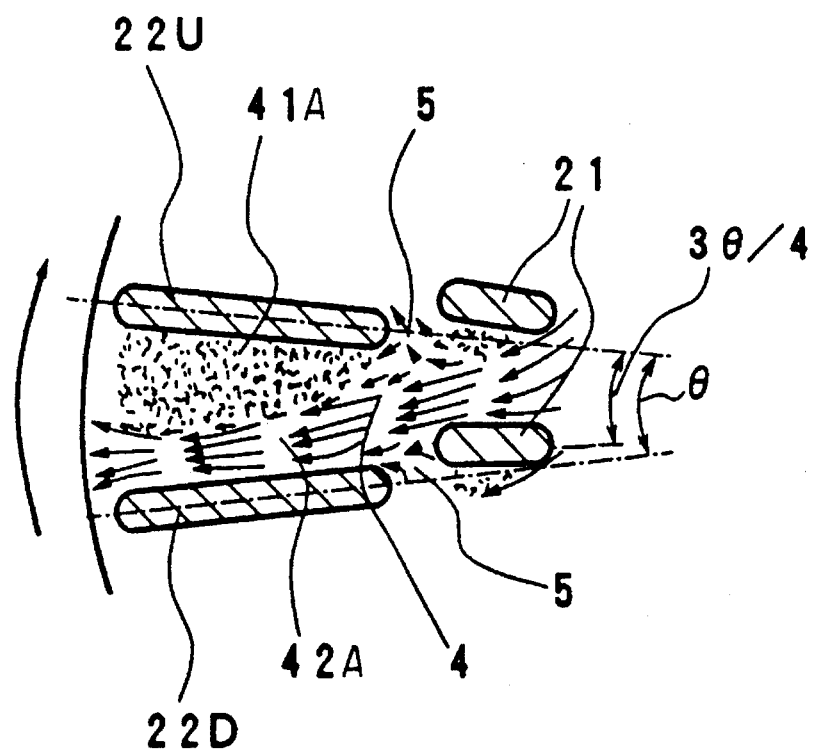
FIG. 14 is a fragmentary sectional view showing a brake disc rotor and a stream as a third preferred embodiment of the present invention.
Figure 15:
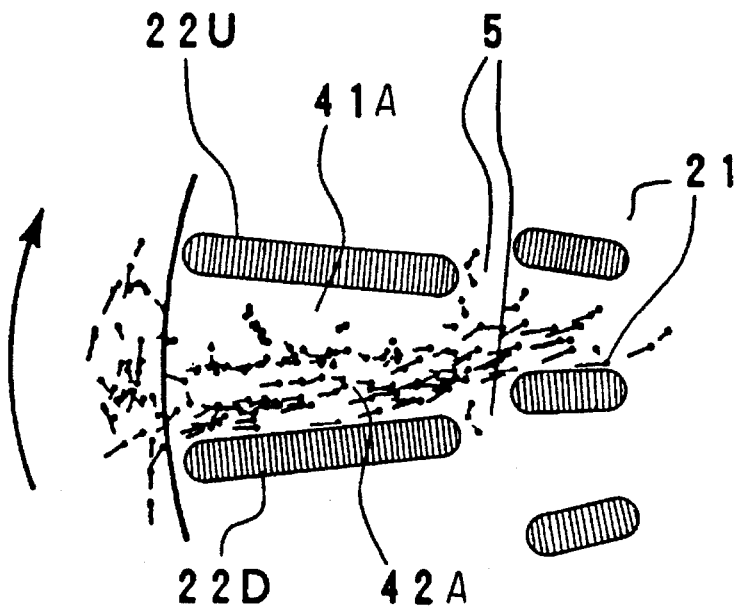
FIG. 15 is a fragmentary sectional view showing a stream within the brake disc rotor as the third preferred embodiment of the present invention by tracer particle process data.

A brake disc rotor of a third preferred embodiment of the present invention is constituted such that the inner partition walls 21 are arranged at a position where a phase is shifted behind by 3θ/4 relative to the outer partition wall 22U on the upstream side of the stream and ahead by θ/4 relative to the outer partition wall 22D on the downstream side of the stream, as shown in FIGS. 14 and 15. Therefore, since the stream between the inner partition walls on the underside in FIG. 15 partially flows in between the above outer partition walls, and otherwise, the stream passing through between the mutually adjacent inner partition walls 21 becomes the stream smoothly passing through between the mutually adjacent outer partition walls as it is, the resistance of the stream is lessened. As a result, the brake disc rotor of the third preferred embodiment exerts such an effect as to increase the flow rate, as well as the similar operation and effect to those in the first preferred embodiment.

Figure 16:
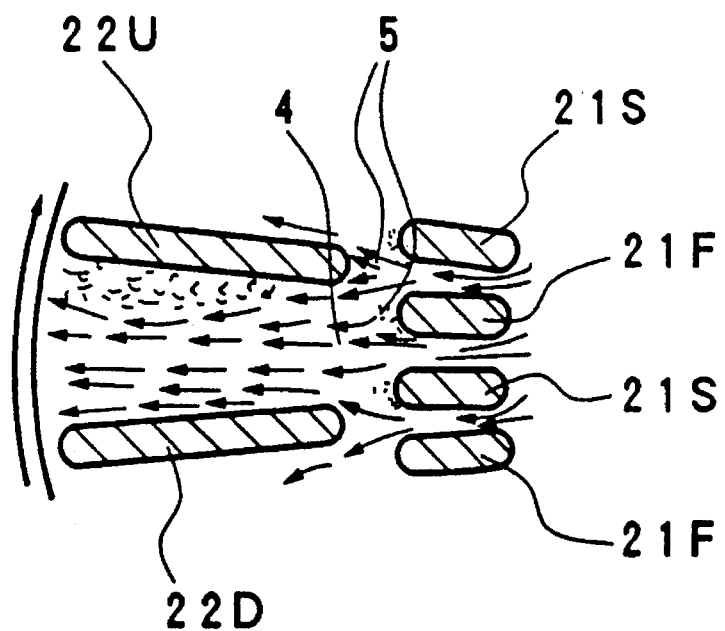
FIG. 16 is a fragmentary sectional view showing a brake disc rotor and a stream as a fourth preferred embodiment of the present invention.

A brake disc rotor of a fourth preferred embodiment of the present invention is constituted such that a first inner partition wall 21F is arranged at a position where a phase is shifted behind by θ/4 relative to the outer partition wall 22U on the upstream side of the stream, and a second inner partition wall 21S is arranged at a position where a phase is shifted behind by θ/2 relative to the first inner partition wall 21F and ahead by θ/4 relative to the outer partition wall 22D on the downstream side of the stream, as shown in FIG. 16.

The brake disc rotor of the fourth preferred embodiment exerts such an effect as to practice the merit of the symmetry of left and right wheels of a vehicle similarly to the case of the first preferred embodiment, as well as to realize the positive injection of energy by controlling the flow separation on the suction surface side of the outer partition walls 22U and 22D by allowing the stream flowing from between the inner partition walls 21F and 21S to have the directionality.

Figure 17:
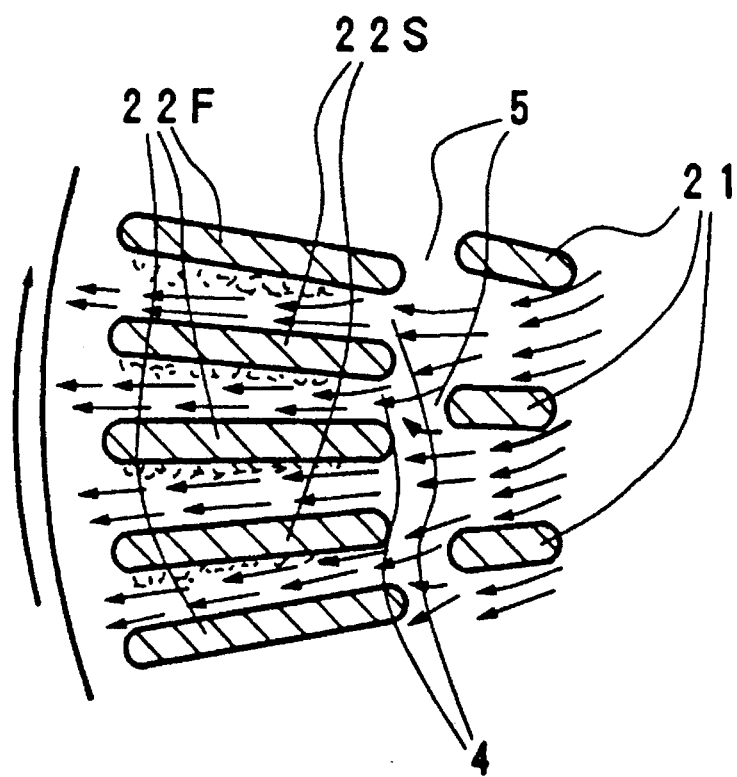
FIG. 17 is a fragmentary sectional view showing a brake disc rotor and a stream as a fifth preferred embodiment of the present invention.
Figure 18:
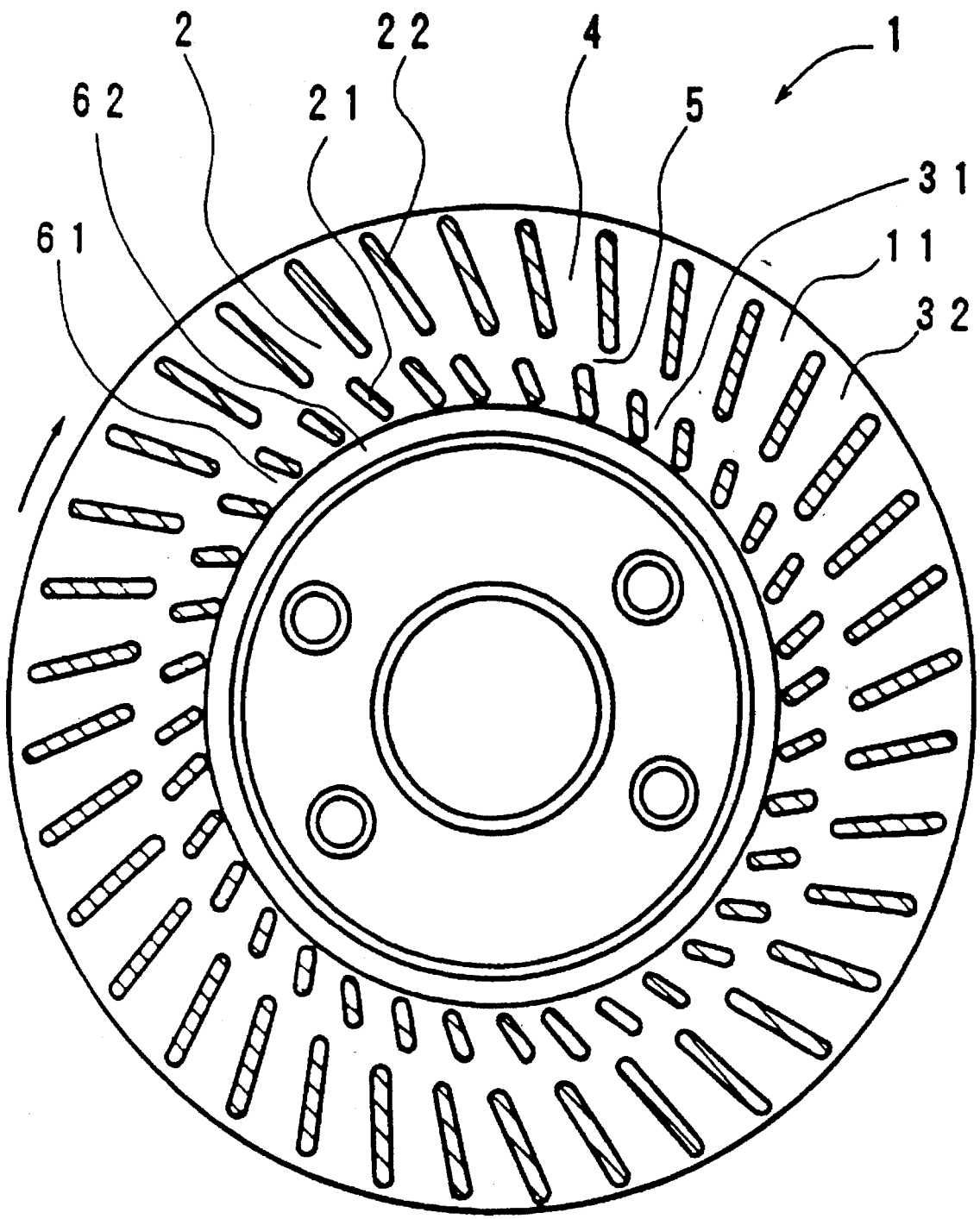
FIG. 18 is a cross-sectional view showing a brake disc rotor as a sixth preferred embodiment of the present invention.

A brake disc rotor of a fifth preferred embodiment of the present invention is constituted such that a first outer partition wall 22F is arranged at a position where a phase is shifted behind by θ/4 relative to the inner partition wall 21 on the upstream side of the stream, and a second outer partition wall 22S is arranged at a position where a phase is shifted behind by θ/2 relative to the first outer partition wall 22F and ahead by θ/4 relative to the inner partition wall 21 on the downstream side of the stream, as shown in FIG. 17.

The brake disc rotor of the fifth preferred embodiment having the constitution described above realizes the increase in surface area with respect to the outer partition walls 22F and 22S while securing the opening area between the inner partition walls 21, and exerts such an effect as to attain multiple fin application, to improve the blowing and cooling efficiency of the rotor and to increase the total quantity of heat dissipation for expanding the effective cooling area, as well as to realize the merit of the symmetry of left and right wheels of a vehicle.

A brake disc rotor of a sixth preferred embodiment of the present invention, as shown in FIGS. 18 to 20 and FIGS. 6, 8, 10 and 11, comprises: sliding plates 11 and 12 on the inside and outside both provided parallel to and separately from each other in the axial direction of an axle (not shown); a plurality of fins 2 composed of mutually adjacent outer partition walls 22 provided radially between the sliding plates 11 and 12 and arranged at an angle not more than an inflow angle of the stream in the radial direction and mutually adjacent inner partition walls 21 arranged at the intermediate portion between the outer partition walls; a plurality of openings 31 and 32 opening inward and outward in the radial direction between the sliding plates 11 and 12; a plurality of ventilation holes 4 composed of passages 43 and 44 formed by the sliding plates 11 and 12 and the mutually adjacent inner and outer partition walls 21 and 22; connecting openings 5 formed between the inner and outer partition walls 21 and 22 which are arranged alternately, for allowing the mutually adjacent ventilation holes 4 to communicate to each other; an R-portion 61 constituting a chamfered portion on the end of the inner wall of the inside sliding plate, a direction converting portion 62 constituting a projection portion on the end of the outside sliding plate; heat dissipating fins 7 radially arranged on the inner wall constituting each ventilation hole 4 of the inside and outside sliding plates.

Figure 19:
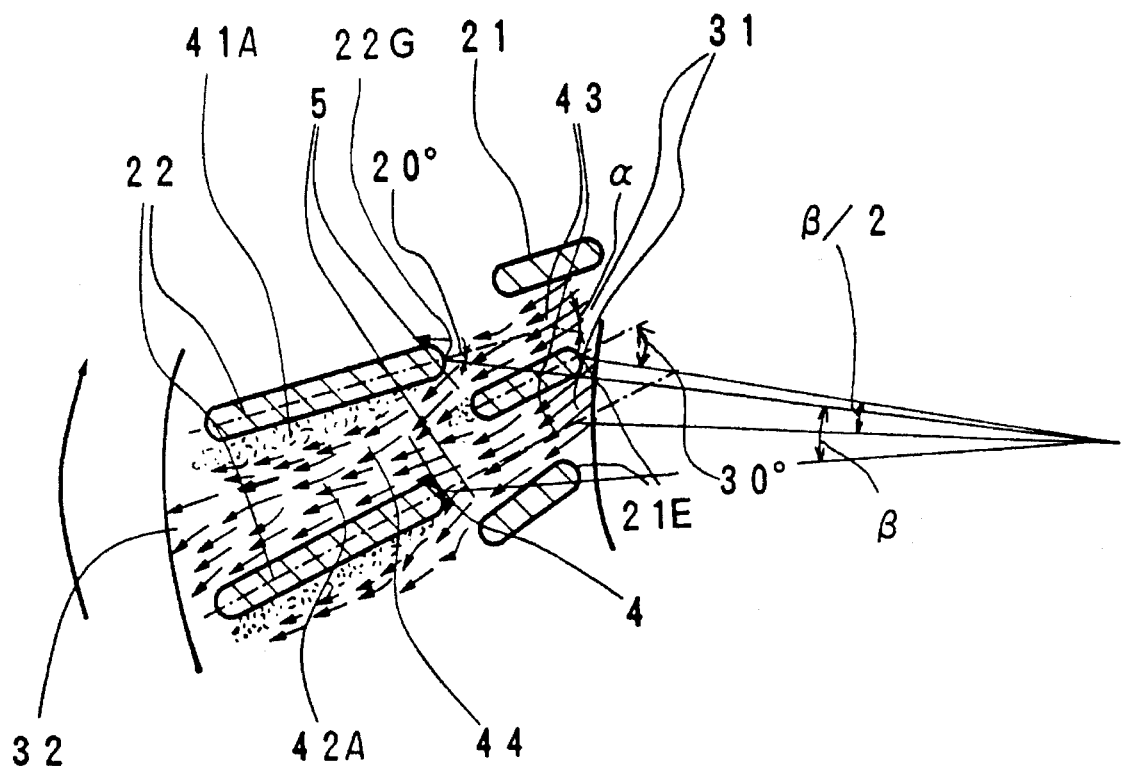
FIG. 19 is a fragmentary cross-sectional view showing a stream within the brake disc rotor as the sixth preferred embodiment of the present invention.
Figure 20:
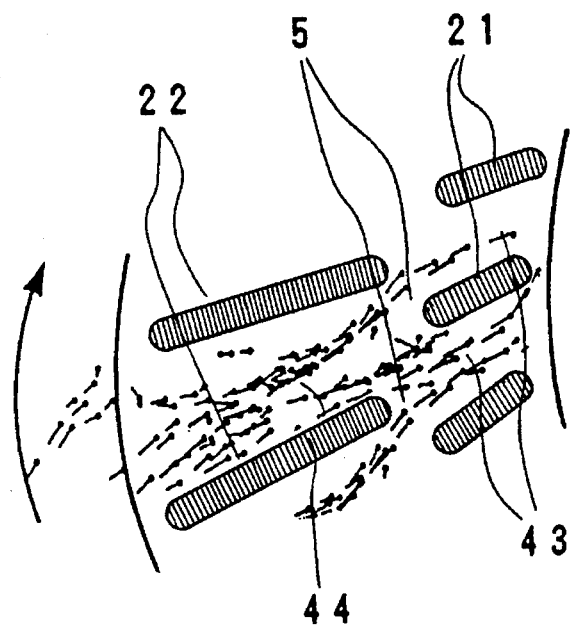
FIG. 20 is a fragmentary sectional view showing a stream within the brake disc rotor as the sixth preferred embodiment of the present invention by tracer particle process data.

The fins 2 are composed of the inner partition walls 21 and the outer partition walls 22 both of which are 4.5 mm in thickness, provided radially between the inside and outside sliding plates 11 and 12 in the range of 165 mm to 275 mm in radius, inclined in the radial direction and integrally molded with the inside and outside sliding plates 11 and 12. The inner partition walls 21 are arranged at the symmetrical position on the inner side at an angle of β/2 relative to the outer partition walls 22 mutually adjacent to each other at an angle of β. The angle β is formed by the ends of two adjacent outer portion walls in relation to the center of the rotor as a standard. The inner partition walls 21 are inclined at an angle of 30° relative to a radial straight line for connecting the end 21E of the inner partition wall 21 with the center (not shown) of a disc, as shown in FIG. 19, and the outer partition walls 22 are inclined at an angle smaller than the angle of 40° of the inner partition walls 21, namely, the outer partition walls 22 are inclined at an angle of 20° relative to a radial straight line for connecting the end 22G of the outer partition wall 22 with the center of the disc. As a result, the blade action on the pressure surface side is effectively secured, which constitutes a so-called two-stage inclined fin structure.

The ventilation hole 4 is linearly expanded according as the thickness of each of the inside and outside sliding plates 11 and 12 is increased outward in the radial direction. The height of the ventilation hole 4 is 14 mm at the inlet opening 31, and 9 mm at the outlet opening 32. Since the inner partition walls 21 and the outer partition walls 22 both constituting the fins 2 are radially formed in an alternate manner, the sectional area of the ventilation hole 4 is made approximately uniform.

The connecting opening 5 is formed at a position in the range of 0.1 L to 0.7 L from the inner end of said inner partition wall, when the difference between the radius of the inner end of said inner partition wall and the radius of the outer end of said outer partition wall, similarly to that of the first preferred embodiment. Although the connecting opening 5 may be formed in the range of 2 mm to 15 mm as a permissible length, the length of the connecting opening 5 in this preferred embodiment is set as 6.6 mm and divides the fins 2 into the inner partition walls 21 of 15 mm in length and the outer partition walls 22 of 34 mm in length. In the direction of the stream within the disc, the connecting opening 5 is formed at a position in the range of 0.56 L to 0.67 L at the time when the inner partition walls 21 are proposed on the extension line of the outer partition walls 22.

Any constitution other than that described above is similar to that of the first preferred embodiment, and any detailed description thereof will be omitted. As shown in FIG. 6 and FIGS. 18 to 20, the brake disc rotor of the sixth preferred embodiment smoothly transforms the stream in the axial direction of the disc into the radial stream in cooperation with the R-portion 61 and the direction converting portion 62 in the inlet opening 31, which allows the stream to flow into the ventilation hole 4 at an inflow angle of 40°. Accordingly, the stream smoothly flowing along the wall surface on the pressure surface side is formed without generating the flow separation in the vicinity of the opening of the inner partition walls 21 of the fins 2 inclined at an angle of 30°. Further, since the inner partition walls are arranged at a position where a phase is shifted behind by $\beta/2$ relative to the outer partition walls, the stream is positively formed on the suction surface side of the outer partition walls by allowing approximately half of the stream described above to flow into the ventilation hole 4 on the downstream side through the connecting opening 5. As a result, the stagnation area 41a is narrowed to form a wide main stream area 42a, the stream separated at the inner partition walls is urged to be added again, and the generation of the flow separation on the suction surface side of the outer partition walls 22 of the fins 2 is controlled.

Namely, since both the inner partition walls 21 and the outer partition walls 22 are formed at an angle close to the inflow angle $\alpha$ (40°–50°) of the stream, the stream flows inherently along the inner and outer partition walls described above. Therefore, the flow separation of the stream from the partition walls is less than that in case of the preceding embodiments, so that both the steams on the pressure surface side and the suction surface side of the inner partition walls merge together between the mutually adjacent outer partition walls 22 through the connecting opening 5 to form a wide main stream area 42.

In the brake disc rotor of the sixth preferred embodiment, since the inner and outer partition walls 21 and 22 are arranged at an angle close to the inflow angle of the stream, the stream flowing along the partition walls 21 and 22 described above is formed more effectively than that in case of the preceding embodiments. Accordingly, the flow separation of the stream from the partition walls is prevented more effectively, and the stagnation area 41a is narrowed to form a wide main stream area 42a. As a result, the brake disc rotor of the sixth preferred embodiment exerts such an effect as to improve the blowing and cooling efficiency of the rotor, to increase the total quantity of heat dissipation for effectively expanding the cooling area, and to improve the cooling capacity up to approximately 17% by reducing the pressure loss of the stream.

Figure 21:
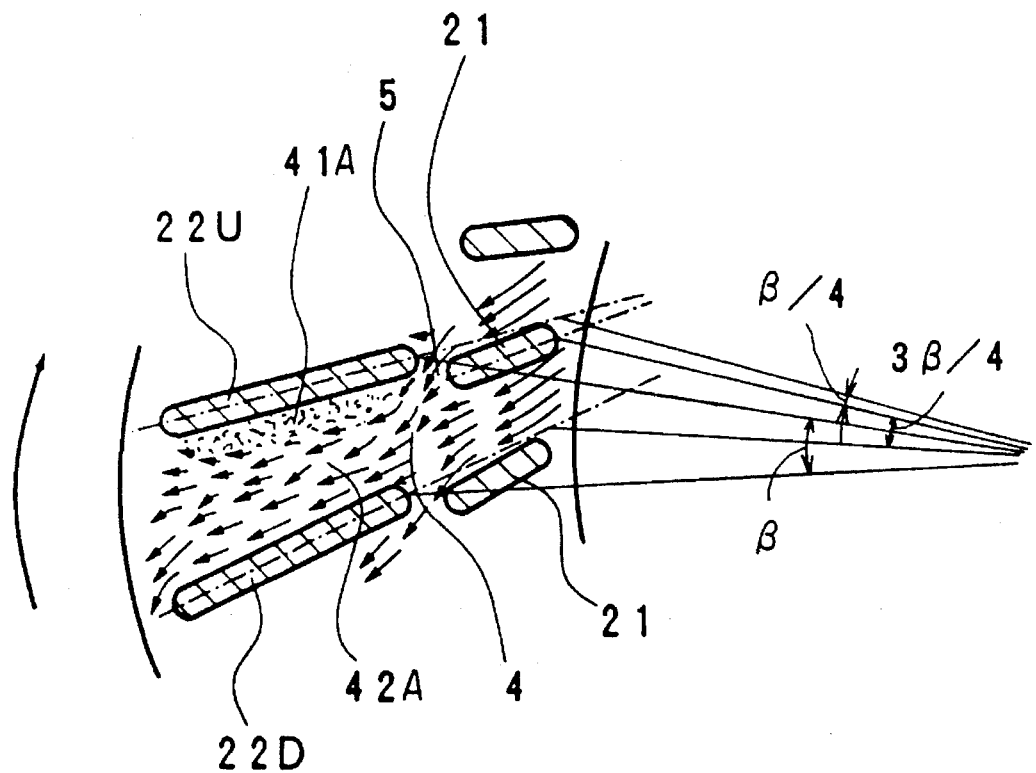
FIG. 21 is a fragmentary cross-sectional view showing a stream within a brake disc rotor as a seventh preferred embodiment of the present invention.
Figure 22:
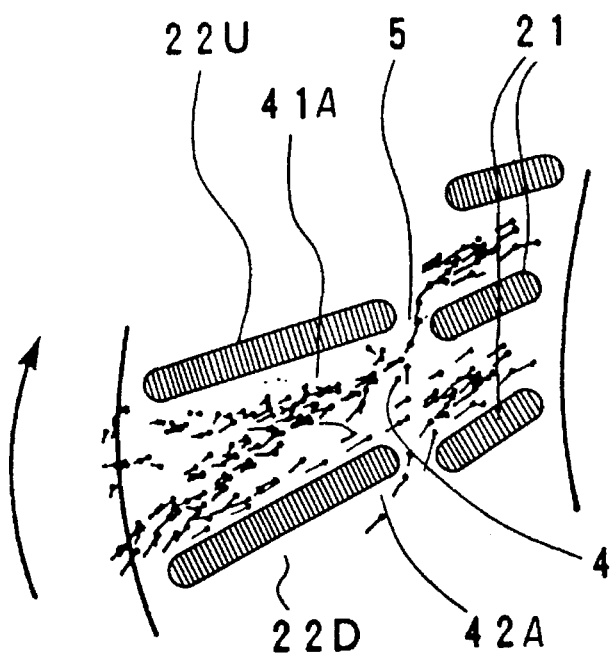
FIG. 22 is a fragmentary sectional view showing a stream within the brake disc rotor as the seventh preferred embodiment of the present invention by tracer particle process data.

A brake disc rotor of a seventh preferred embodiment of the present invention is constituted such that the inner partition walls 21 are arranged at a position at an angle of $\beta/4$ behind relative to the outer partition wall 22U on the upstream side of the stream and at an angle of $3\beta/4$ ahead relative to the outer partition wall 22D on the downstream side of the stream, as shown in FIGS. 21 and 22, differently from the brake disc rotor of the sixth preferred embodiment, in which the inner partition walls are arranged by varying the angle by $\beta/2$ behind relative to the outer partition walls 22.

In the brake disc rotor of the seventh preferred embodiment, since the interval between the inner and outer partition walls is shorter than that in case of the sixth preferred embodiment, the stream flowing between the inner partition walls 21 partly forms the stream flowing close to the suction surface of the outer partition wall 22U through the connecting opening 5, and most of the stream passing through between the inner partition walls 21 on the underside in the drawing is allowed to flow in between the outer partition walls through the connecting opening formed between the outer partition walls 22U and 22D on the downstream side. Accordingly, the stagnation area 41a on the suction surface side of the outer partition walls 22 is further narrowed to enlarge a main stream area 42a. As a result, the brake disc rotor of the seventh preferred embodiment exerts such an effect as to improve the blowing and cooling efficiency of the rotor 1 and to increase the total quantity of heat dissipation for expanding the effective cooling area.

Figure 23:
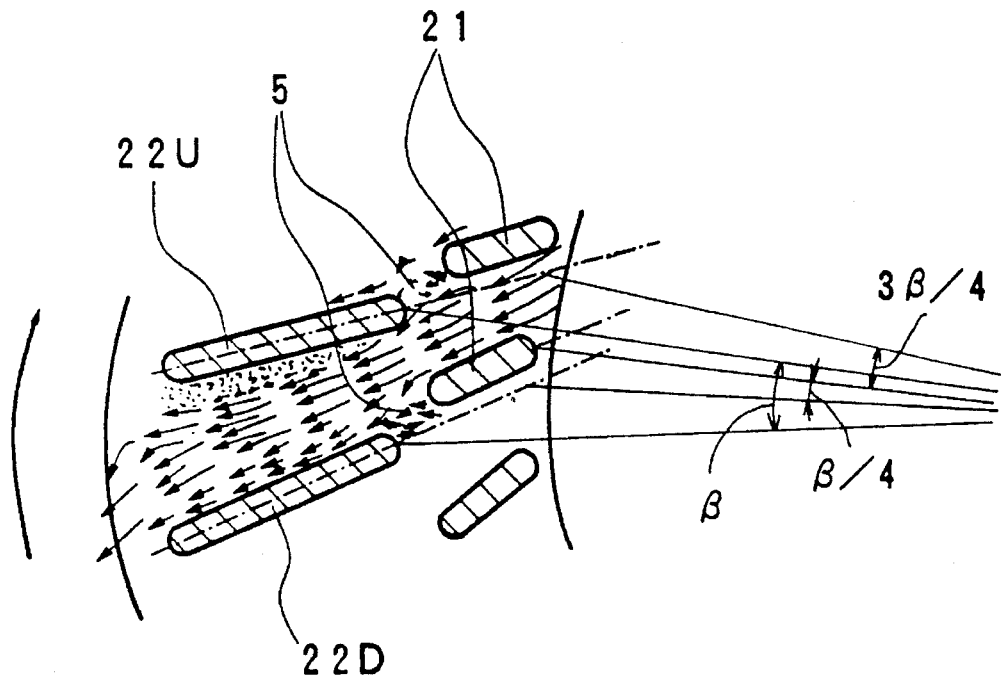
FIG. 23 is a fragmentary cross-sectional view showing a stream within a brake disc rotor as an eighth preferred embodiment of the present invention.
Figure 24:
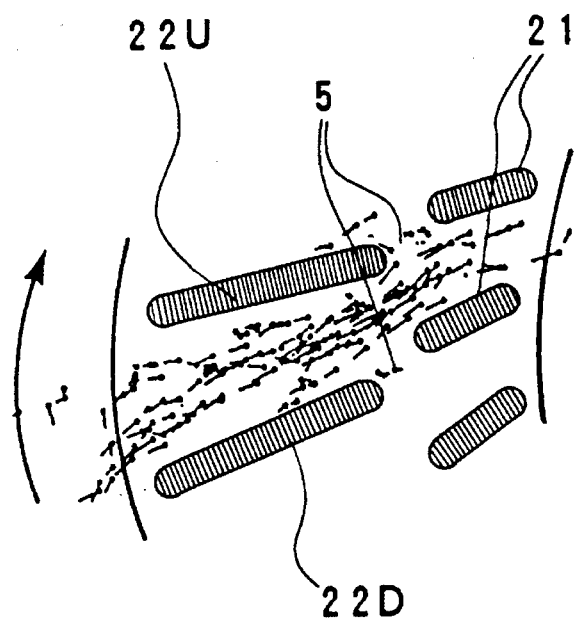
FIG. 24 is a fragmentary sectional view showing a stream within the brake disc rotor as the eighth preferred embodiment of the present invention by tracer particle process data.

A brake disc rotor of an eighth preferred embodiment of the present invention is different from that of the preceding embodiments in such a point that the inner partition walls 21 are arranged at a position at an angle of $3\beta/4$ behind relative to the outer partition wall 22U on the upstream side of the stream and at an angle of $\beta/4$ ahead relative to the outer partition wall 22D on the downstream side of the stream, as shown in FIGS. 23 and 24.

In the brake disc rotor of the eighth preferred embodiment, since there is almost no stream passing through the connecting opening 5, and only the circulating stream is slightly formed, the stream passing through between the mutually adjacent inner partition walls having the large effective opening area smoothly passes through between the mutually adjacent outer partition walls. Accordingly, the stagnation area 41a is narrowed to enlarge a main stream area 42a, and the resistance of the stream between the inner partition walls is lessened. As a result, the brake disc rotor of the eighth preferred embodiment exerts such an effect as to increase the flow rate, as well as the approximately similar operation and effect to the sixth preferred embodiment.

Figure 25:
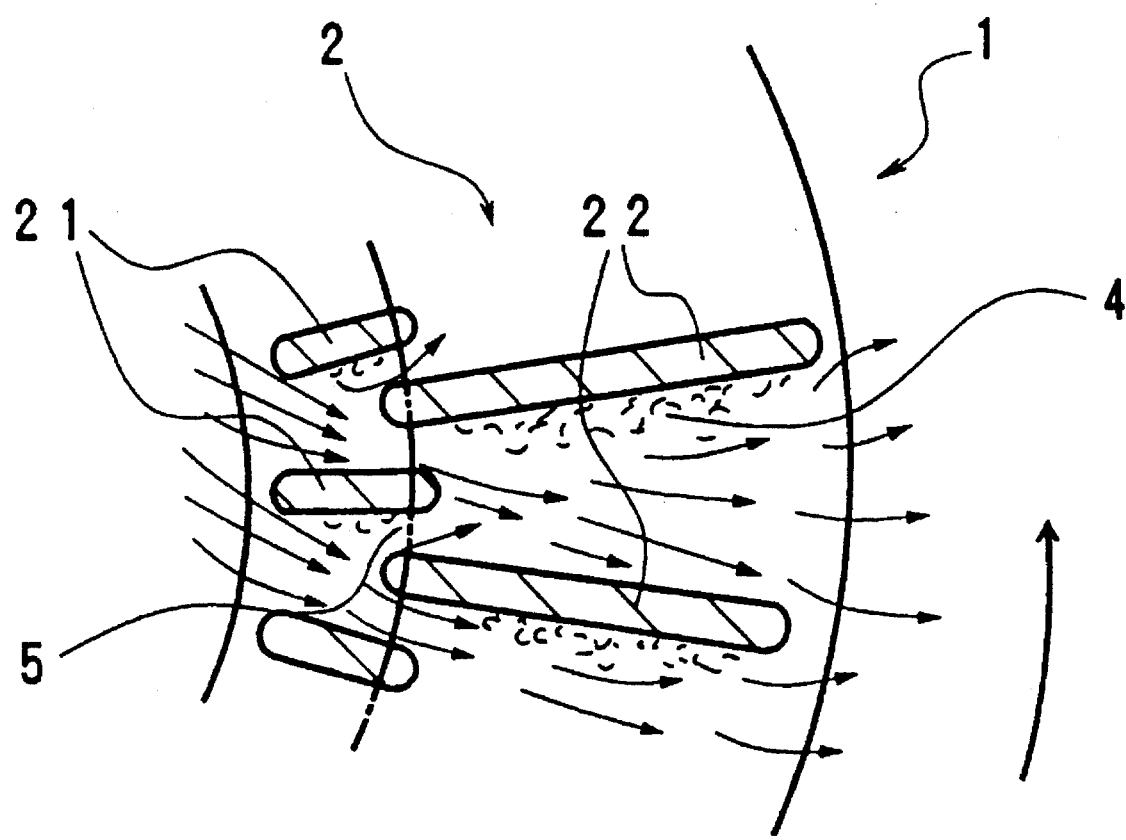
FIG. 25 is a fragmentary sectional view showing a stream within the brake disc rotor as the ninth preferred embodiment of the present invention.

A brake disc rotor of a ninth preferred embodiment of the present invention is constituted such that the inner partition wall 21 is arranged between the mutually adjacent outer partition walls 22, the inner and outer partition walls 21, 22 being arranged in the radial direction of the disc rotor 1, the outer end of the inner partition wall 21 being in the close to vicinity of the outer side from the inner end of the outer partition wall 22, as shown in FIG. 25.

In the brake disc rotor of the ninth preferred embodiment, since the outer end of the inner partition wall 21 is in the close vicinity of the outer side from the inner end of the outer partition, there is formed no ring region as observed in the above described embodiments, which ring region is located in the gap between the outer end of the inner partition wall 21 and the inner end of the outer partition wall 22 and thus has no partition wall.

As a result, the brake disc rotor of the ninth preferred embodiment exerts such an effect as to prevent the heat ring in cooling process and restrain the temperature distribution of the rotor influenced to the thermal deformation thereof, as well as the same effects as in the above embodiments.

Figure 26:
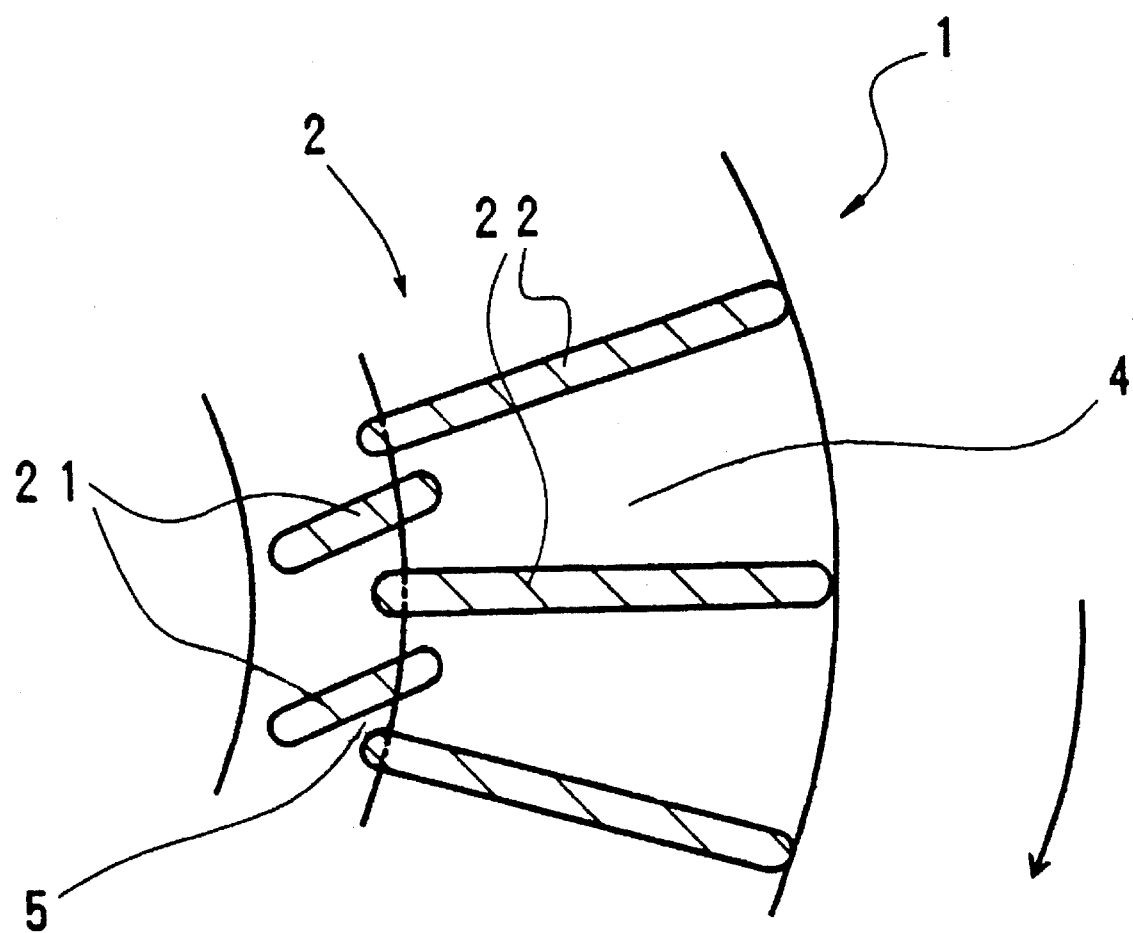
FIG. 26 is a fragmentary sectional view showing a stream within the brake disc rotor as the tenth preferred embodiment of the present invention.

A brake disc rotor of a tenth preferred embodiment of the present invention is constituted such that the inner partition wall 21 is arranged between the mutually adjacent outer partition walls 22, the inner partition wall 21 is inclined with respect to the radial direction of the disc rotor and the outer partition wall 22 being arranged in the radial direction of the disc rotor 1, and the outer end of the inner partition wall 21 being in the close to vicinity of the outer side from the inner end of the outer partition wall 22, as shown in FIG. 26.

In the brake disc rotor of the tenth preferred embodiment, since the outer end of the inner partition wall 21 is in the close vicinity of the outer side from the inner end of the outer partition, there is formed no ring region as observed in the above described embodiments, which ring region is located in the gap between the outer end of the inner partition wall 21 and the inner end of the outer partition wall 22 and thus has no partition wall.

As a result, the brake disc rotor of the ninth preferred embodiment exerts such an effect as to prevent the heat ring in cooling process and restrain the temperature distribution of the rotor influenced to the thermal deformation thereof as well as the same effects as in the above embodiments.

A brake disc rotor of an eleventh preferred embodiment of the present invention is applied to a disc brake device for use in an automobile similarly to that of the first preferred embodiment, and details thereof will be described with reference to FIGS. 27 to 31. FIG. 6, 8, 10 and 11 used for the explanation of the first preferred embodiment will be also used for the explanation of the eleventh preferred embodiment, and the same portions are given the same symbols.

A brake disc rotor 1 as the eleventh preferred embodiment comprises: sliding plates 11 and 12 on the inside and outside both provided in parallel to and separately from each other in the axial direction of an axle (not shown); a plurality of fins 2 composed of mutually adjacent inner partition walls 121 and outer partition walls 122 provided radially between the sliding plates 11 and 12 and arranged along a straight line provided in the radial direction; a plurality of openings 31 and 32 opening inward and outward in the radial direction between the sliding plates 11 and 12; a plurality of ventilation holes 4 composed of passages 41 and 42 formed by the sliding plates 11 and 12 and the mutually adjacent inner and outer partition walls 121 and 122; connecting openings 105 formed between the inner and outer partition walls 121 and 122 and for allowing the mutually adjacent ventilation holes to communicate to each other; an R-portion 61 constituting a chamfered portion on the end of the inner wall of the inside sliding plate; a direction converting portion 62 constituting a projection portion on the end of the outside sliding plate; and heat dissipating fins 7 arranged radially on the inner wall constituting each ventilation hole 4 of the inside and outside sliding plates.

The outside sliding plate 12 is provided integrally with a boss portion 14 having a hole for fixation through a step portion 13 together with the inside sliding plate 11, as shown in FIG. 6. The inside and outside plates 11 and 12 linearly increase in thickness accordingly as both the sliding plates come outward in the radial direction to result in linearly reducing the height of the ventilation hole 4.

Figure 27:
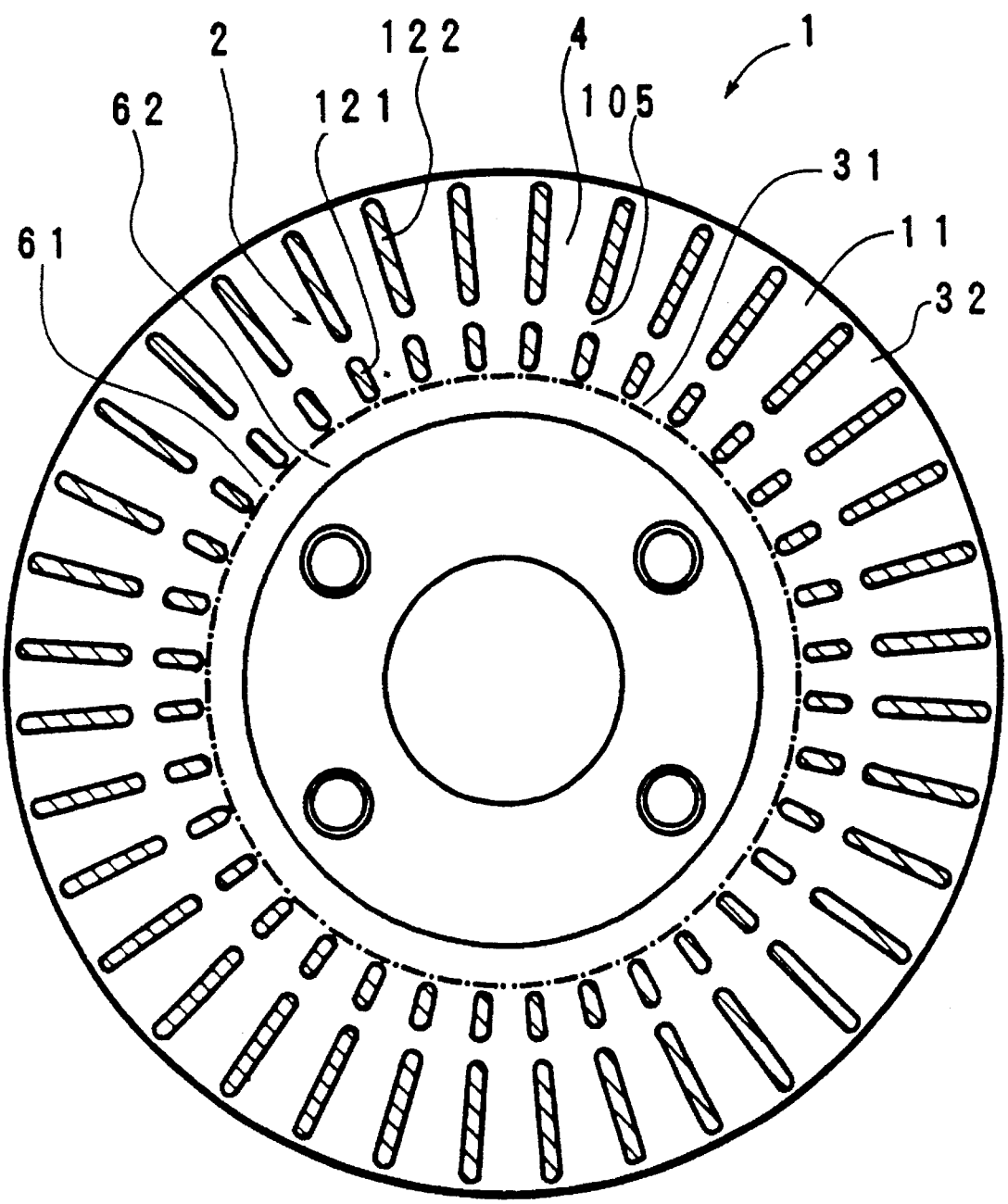
FIG. 27 is a cross-sectional view showing a brake disc rotor as an eleventh preferred embodiment of the present invention.
Figure 28:
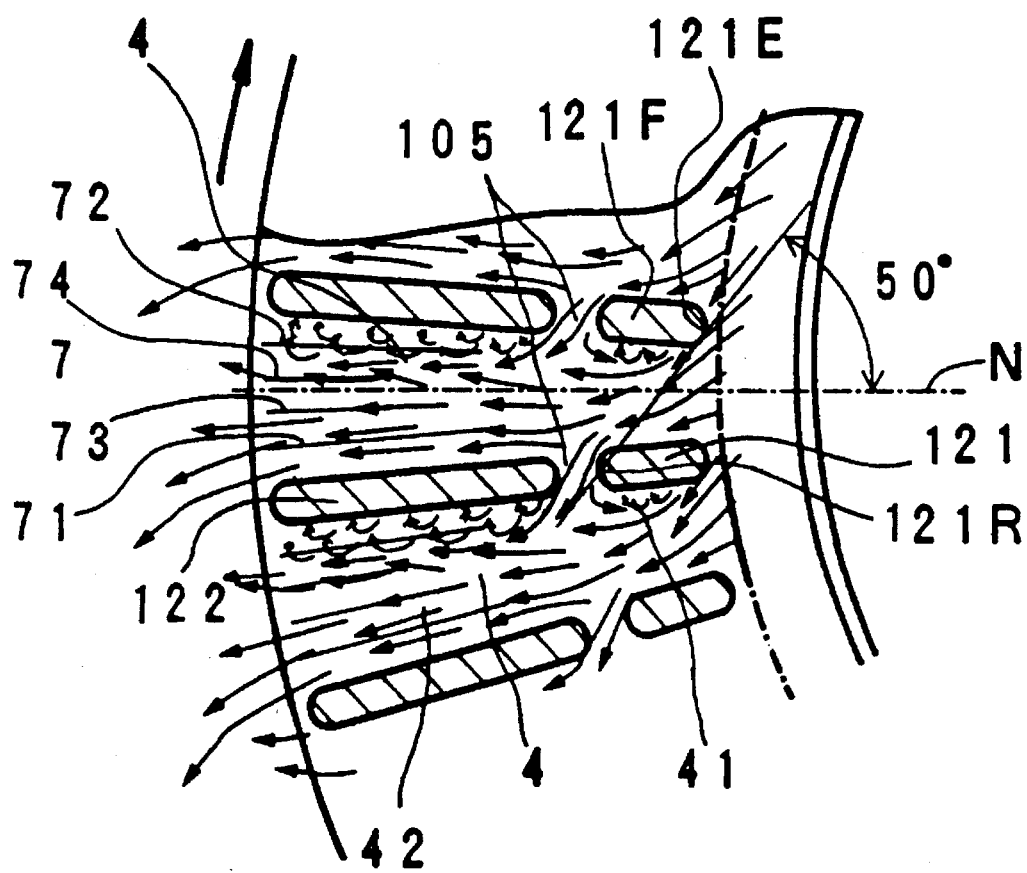
FIG. 28 is a fragmentary sectional view showing a stream within the brake disc rotor as the eleventh preferred embodiment of the present invention.

As shown in FIGS. 27 and 28, the fins 2 are 4.5 mm in thickness and include inner fins 121 and outer fins 122 integrally molded which are provided along a straight line in the radial direction in the range of 165 mm to 275 mm in radius between the outside and inside sliding plates 11 and 12.

As shown in FIG. 6, the ventilation hole 4 is linearly enlarged according as the thickness of each of the inside and outside sliding plates 11 and 12 is increased outward in the radial direction. The height of the ventilation hole 4 is 14 mm at an inlet opening 31, and 9 mm at an outlet opening 32. Since the inner partition walls 121 and the outer partition walls 122 both constituting the fins 2 are formed radially in an alternate manner, the section area of each of the inner and outer ventilation holes 41 and 42 is made approximately uniform.

As shown in FIG. 28, the connecting opening 105 is 6 mm in length and divides the fin 2 into the inner partition wall 121 and the outer partition wall 122. The connecting opening 105 is arranged such that a line connecting the end 121E of the inner partition wall 121 of the fin 2 on the upstream side of the stream and the end of the connecting opening 5 (i.e., the rear end 121R of the inner partition wall 121 of the fin 2) has an angle of a approximately 50° relative to a neutral line N of the ventilation hole 4, namely the connecting opening 105 is formed at a position in the range of 0.24 L to 0.39 L (i.e., L represents the difference between the radius of the inner end of said inner partition wall and the radius of the outer end of said outer partition wall.

Figure 29:
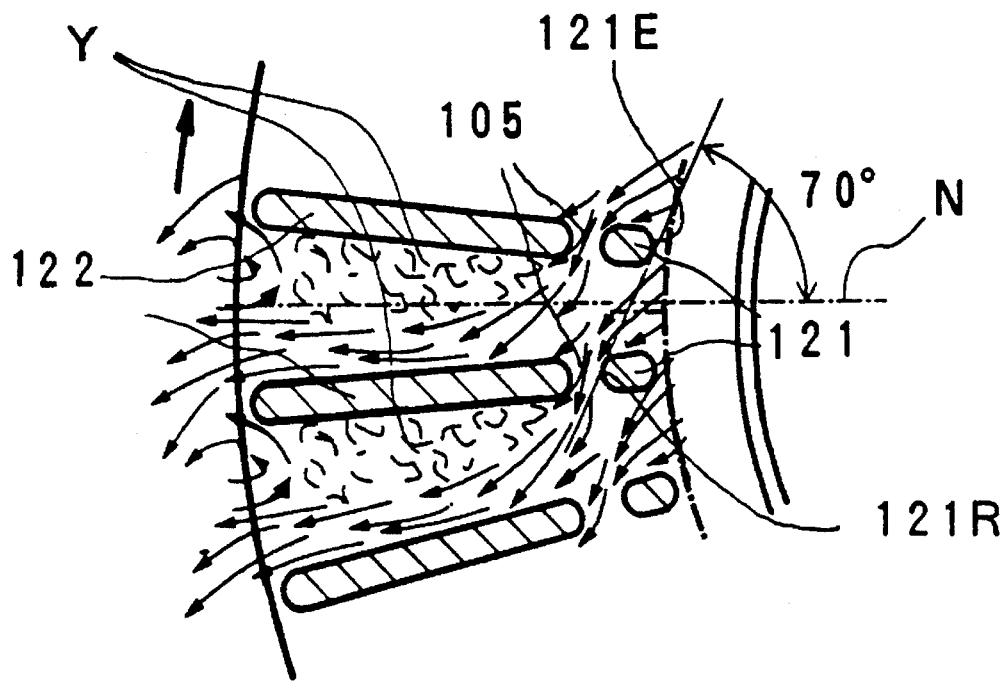
FIG. 29 is a fragmentary sectional view showing a stream in the eleventh embodiment, in which a connecting opening is formed at the position at an angle of 70°.

The permissible installation position of the connecting opening 105 is in the range of 0.1 L (i.e., 70° as the above-mentioned angle) to 0.7 L(30°), although it depends on the inflow angle of the stream into the ventilation hole 4. However, in the case where the installation position is too close to the inlet opening 32 (i.e., 0.1 L or less), the length of the inner partition wall 121 is short, and the stream flowing at an inflow angle of 40° through 50° directly passes through the connecting opening 105 as shown in FIG. 29. As a result, some flow separation and the stagnation area Y are generated on the suction surface of the outer partition wall 122 in the ventilation hole on the adjacent downstream side, thereby enlarging the inflow loss at the inlet portion and decreasing the flow quantity, which leads to the lowering of cooling capacity.

Figure 30:
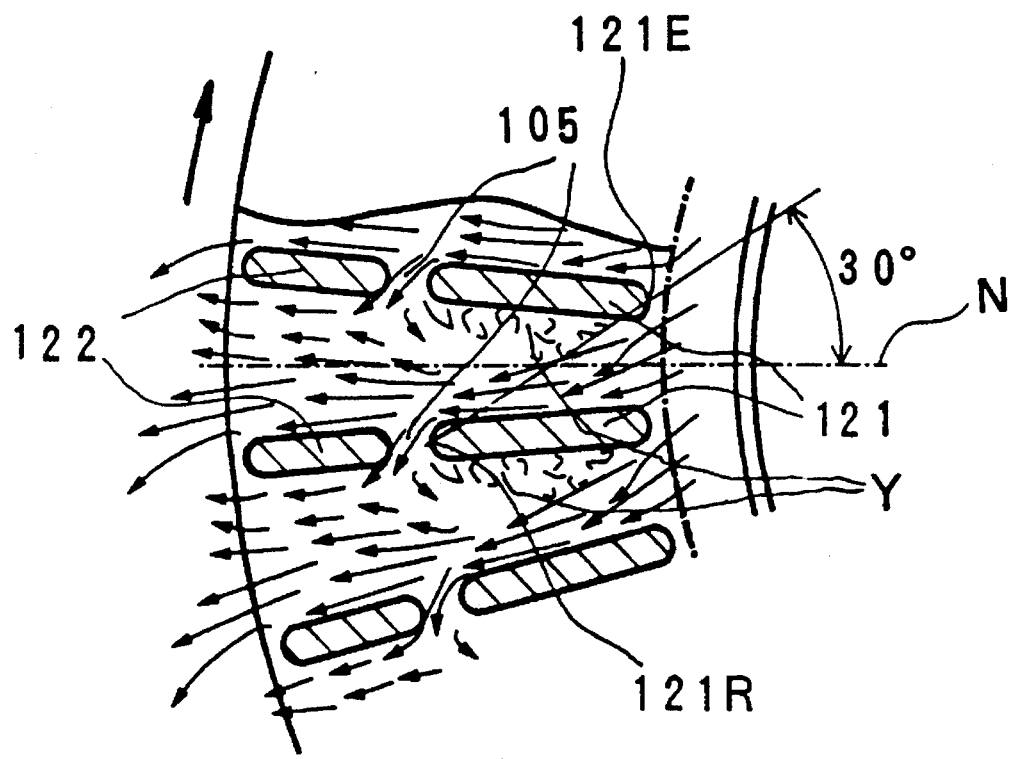
FIG. 30 is a fragmentary sectional view showing a stream in the eleventh embodiment, in which a connecting opening is formed at the position at an angle of 30°.
Figure 31:
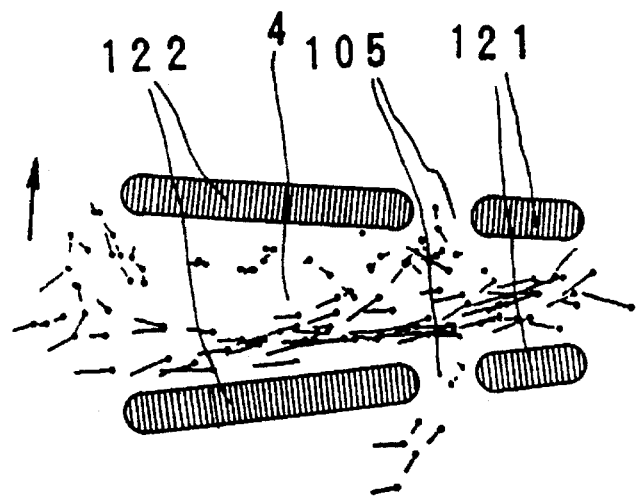
FIG. 31 is a fragmentary sectional view showing a stream within the brake disc rotor as the eleventh preferred embodiment of the present invention by tracer particle process data.

On the other hand, in the case where the installation position of the connecting opening 105 is too close to the outlet opening 32 (i.e., 0.7 L or more), the generation of the flow separation on the outer side is controlled to lessen the stagnation area as shown in FIG. 30. However, since the pressure difference is decreased due to the loss resulting from the expansion of the ventilation hole 4, the pressure recovery effect is lessened, the flow separation is generated at the inlet portion, and the stagnation area is formed on the suction surface side of the inner fin, whereby flow quantity and cooling capacity are lowered. In the case where the installation position is apart by 0.5 L or more, the length of the outer fin becomes short. Accordingly, the difference between the inner energy and the outer energy of the hole for defining the blowing capacity of the ventilation hole becomes small, and the passing flow quantity has a tendency to decreasing. As a result, the limit of the installation position is set as 0.7 L from the standpoint of the balance between the installation position and the pressure recovery effect (i.e., effect to increase the flow quantity) caused by the connecting opening 5.

In the case where a sufficient cooling effect is required, it is preferable to make the installation position of the connecting opening 0.2 L to 0.5 L as a desirable range, although it depends on the installation interval and revolving speed of the fins. In the first preferred embodiment, the installation position of the connecting opening is set in the range of 0.24 L to 0.39 L.

The permissible length of the connecting opening 105 is in the range of 2 mm to 15 mm as a projected length described above. However, when the length of the connecting as opening is short, the effect of the connecting opening as a pressure recovery port is lowered. On the other hand, when the length thereof is long, the length of the fin becomes short, and thus the effect of the connecting opening as a blade (blowing fan) is lowered. As a result, the optimum length of the connecting opening is set in the range of 4 mm to 6 mm. In the eleventh preferred embodiment, the length of the connecting opening is set as 6 mm in consideration of the viewpoint of manufacture.

The R-portion 61 at the end of the inner wall of the inside sliding plate 11 has a corner portion chamfered at an angle of 45°, as shown in FIG. 6, and the portion with the minimum thickness is set as 5 mm from the viewpoint of strength.

The direction converting portion 62 of the outside sliding plate 12 is projected inward in the radial direction from the inside sliding plate 11, and gradually increases in thickness according as the inner wall comes inward, to be formed into a concave arc-like shape which is curved up by 4 mm as shown in FIG. 6. As a result, the direction converting portion 62 transforms the stream in the axial direction of the rotor 1 into the stream outward in the radial direction, and allows the stream into the ventilation hole 4 through the inlet opening 31 in cooperation with the R-portion 61.

The heat dissipating fins 7 has long heat dissipating fins 71 and 72 radially integrated on a portion close to the outer partition wall 122 and short heat dissipating fins 73 and 74 radially integrated on a center portion of the ventilation hole 4, as shown in FIGS. 28 and 8, whereby the heat dissipation effect is enhanced without increasing the resistance of the stream within the ventilation hole 4.

The overall operation of the eleventh preferred embodiment is as follows.

The brake disc rotor of the eleventh preferred embodiment described above smoothly transforms the axial stream into the radial stream in cooperation with the R-portion 61 and the direction converting portion 62 in the inlet opening 31, as shown in FIG. 6, which allows the stream to flow into the ventilation hole 4 at the inflow angle of 40° to 50° through the inlet opening 31, as shown in FIG. 28, and allows the stream flowing along the wall surface on the pressure surface side of the inner partition wall 121 of the fin 2 to smoothly flow into the subsequent ventilation hole 4 which is constituted by the outer partition walls 122U and 122D, through the connecting opening 105. As a result, the generation of the flow separation is controlled on the suction surface side of the outer partition walls 122 of the fins 2, and the stagnation area 41a is narrowed to form a wide main stream area 42a. This fact is apparent from FIG. 31 which shows sketch data of tracer particle process data by a styrene particle tracer method for making the stream visible that traces flowing styrene particles which follow the stream at the time. In this styrene tracer particle method, it is possible to obtain a velocity vector at a local place by determining each correspondence of the floating particle position continuously incorporated, and the results thus obtained well correspond to air-speed measurement data, and accordingly this is suitable to an observation of a main stream.

In the brake disc rotor of the eleventh preferred embodiment having the operation described above, the generation of the stagnation area 41a is controlled by preventing the flow separation on the suction surface side of the outer partition walls 122 of the fins 2, and a wide main stream area 42a is formed in the most desirable form by controlling the generation of a prior art quasisecondary stream, so that the reverse stream produced in the outlet opening as in the case of the prior art can also be controlled. As a result, the brake disc rotor exerts such an effect as to improve the blowing and cooling efficiency of the rotor 1 and to increase the total quantity of heat dissipation for expanding the effective cooling area by minimizing the pressure loss of the stream and by lessening the lowering of the heat transfer coefficient by the surface of cooling wind.

Namely, the cooling capacity as a quantity of heat dissipation is expressed by a product of a heat dissipation area, a heat transfer coefficient and a temperature difference to one another, and in the case of a heat transfer by forced convection, the heat transfer coefficient is in proportion to the power of 0.5 through 0.8 of a flow rate. Therefore, the increase in flow rate is essential to the improvement of the cooling capacity. In other words, since the eleventh preferred embodiment can decrease the passage resistance and increase the flow rate, the quantity of heat dissipation and the cooling capacity are improved by approximately 11%.

Further, since the cooling capacity is in proportion to the heat dissipation area, it is important to increase the cooling area. In the eleventh preferred embodiment, since the cooling area is effectively secured within the limited cooling area to enlarge an area having high heat transfer coefficient, the cooling capacity can be enhanced remarkably.

Furthermore, since the axial stream is transformed smoothly into the radial stream in cooperation with the R-portion 61 and the direction converting portion 62 in the inlet opening 31, as shown in FIG. 6, the brake disc rotor 1 of the eleventh preferred embodiment exerts such an effect as to effectively control the flow separation of the stream produced in the vicinity of the end of the inner wall of the inside sliding plate 11.

Since four pieces of small heat dissipating fins 71 through 74 are formed on the inner wall on the outer side of the inside and outside sliding plates, as shown in FIGS. 28 and 8, the brake disc rotor 1 of the eleventh preferred embodiment exerts such an effect as to effectively enhance the heat dissipation effect without increasing the resistance of the stream within the ventilation hole 4.

Since the inner and outer partition walls 121, 122 of the fins 2 are formed along the straight line in the radial direction and constituted in a symmetrical form as shown in FIG. 27 to allow brakes for left and right wheels of an automobile to be constituted by a same rotor, the brake disc rotor 1 of the eleventh preferred embodiment exerts such an effect as to use a single line for design and manufacture, to reduce the cost and to become remarkably easy from the viewpoint of management.

Since the length of the connecting opening 5 is set as 6 mm as the optimum length, the brake disc rotor 1 of the eleventh preferred embodiment exerts such an effect as to most effectively control the stagnation due to the flow separation on the suction surface side of the fins 2 by the stream passing through the connecting opening 105.

Moreover, since the connecting opening 105 is arranged at a position in the range of 0.24 L (i.e., 50° as the above-mentioned angle) to 0.39 L as the most appropriate position, the brake disc rotor 1 of the first preferred embodiment exerts such an effect as to most effectively control the stagnation due to the flow separation.

A brake disc rotor of a twelfth preferred embodiment of the present invention particularly alters the shape of the fins and the connecting openings in order to more effectively control the flow separation of the stream on the suction surface side of the fins 2 and the generation of any stagnation, from the standpoint of emphasizing on the improvement of the stream within the ventilation hole 4, although the merit of the symmetry to the left and right sides in the eleventh preferred embodiment is sacrificed.

Figure 32:
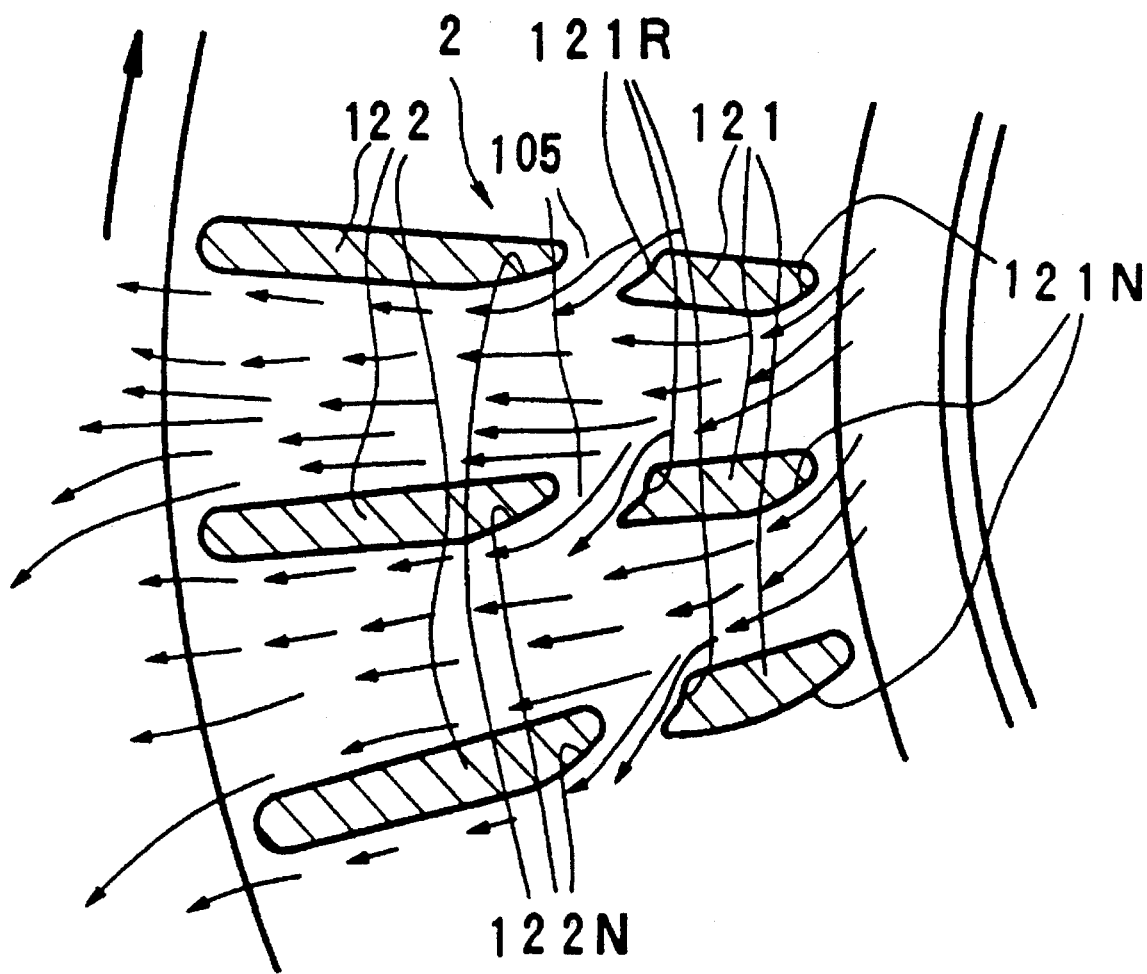
FIG. 32 is a fragmentary sectional view showing a brake disc rotor and a stream as a twelfth preferred embodiment of the present invention.

As shown in FIG. 32, the ends 121N and 122N of the inner and outer fins 121 and 122 of the fins 2 on the suction surface side gradually increase in thickness and are formed into a streamline so that the stream flows along the suction surfaces 121N and 122N of the fins 2. The rear ends 121R of the inner fins 121 constituting the connecting openings 105 are formed into a S-letter shape, so that the stream along the rear ends 121R is allowed to direct to and flow along the suction surfaces 122N of the outer fins 122. The installation position of the connecting opening 105 is set in the range of approximately 0.3 L to 0.5 L from the inner end of the fin 2, and the length of the connecting opening 105 is set as approximately 7 mm.

In the brake disc rotor of the twelfth preferred embodiment having the constitution described above, since the stream flowing into the ventilation hole 4 flows along the streamlined ends 121N of the inner fins 121 on the suction surface side, the flow separation of the stream and the stagnation are further controlled in comparison with those in the eleventh preferred embodiment, and the stream passing through the connecting openings 105 smoothly flows along the suction surfaces 122N of the outer fins 122 by the S-letter shape of the rear end 121R of the inner fin 121 and the streamline shape of the suction surface 122N of the outer fin 122. As a result, the brake disc rotor of the twelfth preferred embodiment exerts such an effect as to more effectively control the stagnation by preventing the generation of the flow separation at the lower portion of the suction surfaces of the outer fins 122, in comparison with that in the eleventh preferred embodiment.

Figure 33:
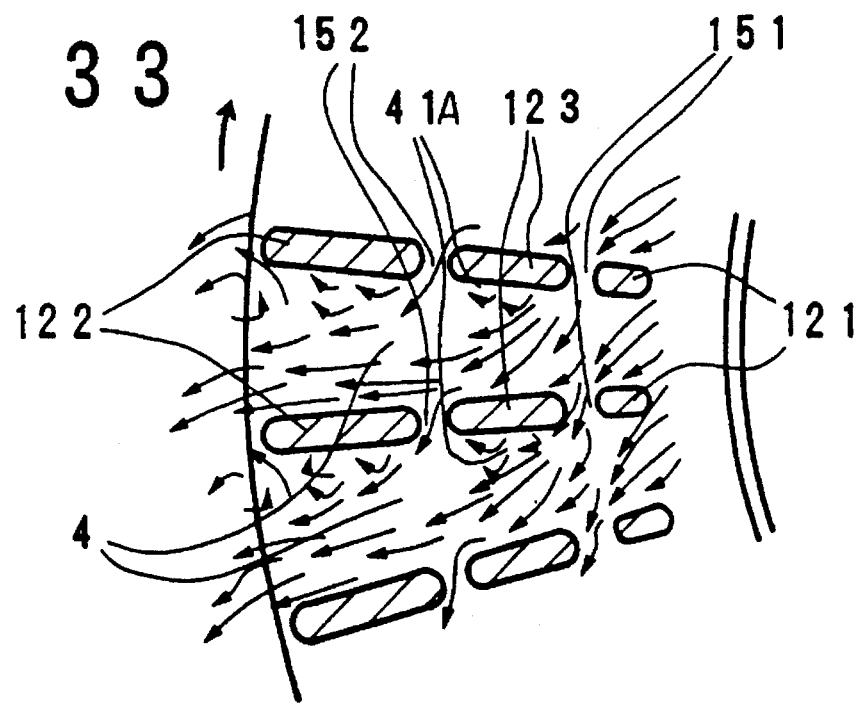
FIG. 33 is a fragmentary sectional view showing a brake disc rotor and a stream as a thirteenth preferred embodiment of the present invention.

A brake disc rotor of a thirteenth preferred embodiment of the present invention is constituted such that a plurality of connecting openings 151 and 152 are formed in the fins, and the fins are composed of three portions, i.e., inner fins 121, intermediate fins 123 and outer fins 122, as shown in FIG. 33. The second connecting opening 152 is formed at a position where any stagnation area 41a does not grow due to the flow separation after the stream passes through the first connecting opening 151. The brake disc rotor of the thirteenth preferred embodiment forms the stream by taking advantage of the pressure difference, controls the expansion of the stagnation area 41a by preventing the flow separation, and forms a much wider main stream area 42a to improve the blowing and cooling efficiency.

Figure 34:
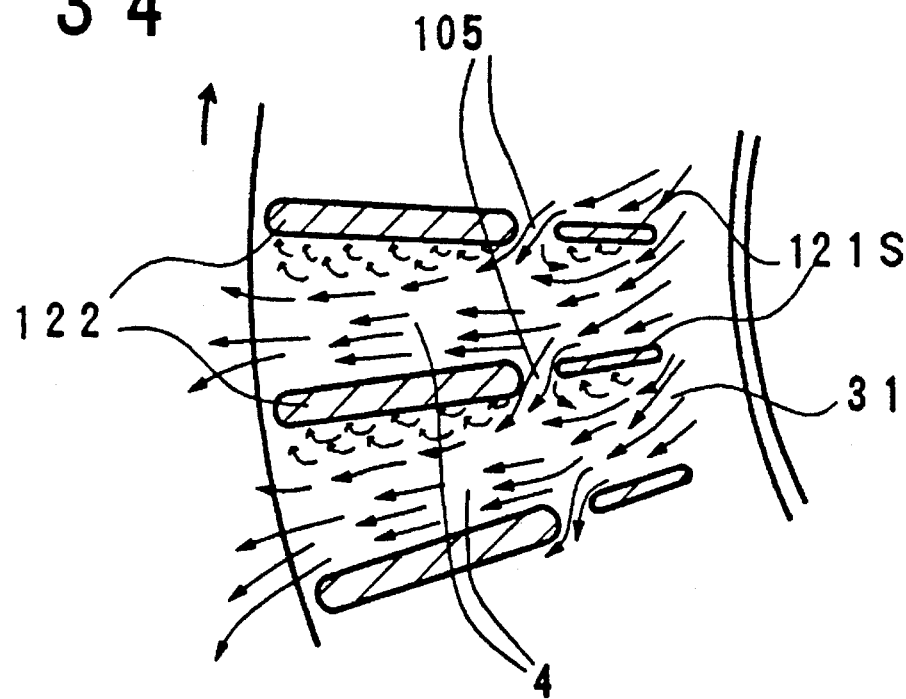
FIG. 34 is a fragmentary sectional view showing a brake disc rotor and a stream as a fourteenth preferred embodiment of the present invention.

A brake disc rotor of a fourteenth preferred embodiment of the present invention is constituted such that the inner fins 121 in the first preferred embodiment are changed into thin inner fins 121S making the thickness in the inner direction of the rotor thin, and the area of the inlet opening 31 is enlarged to lessen the inflow resistance, as shown in FIG. 34. Accordingly, the brake disc rotor of the fourteenth preferred embodiment further improves the blowing and cooling efficiency.

The brake disc rotor of the fourteenth preferred embodiment is particularly effective in case of increasing the number of sheets of fins, since the outer side portion has a higher pressure in case of a floating caliper, and accordingly, the thick outer fins 122 of the fins are sufficient to get satisfactory strength.

Figure 35:
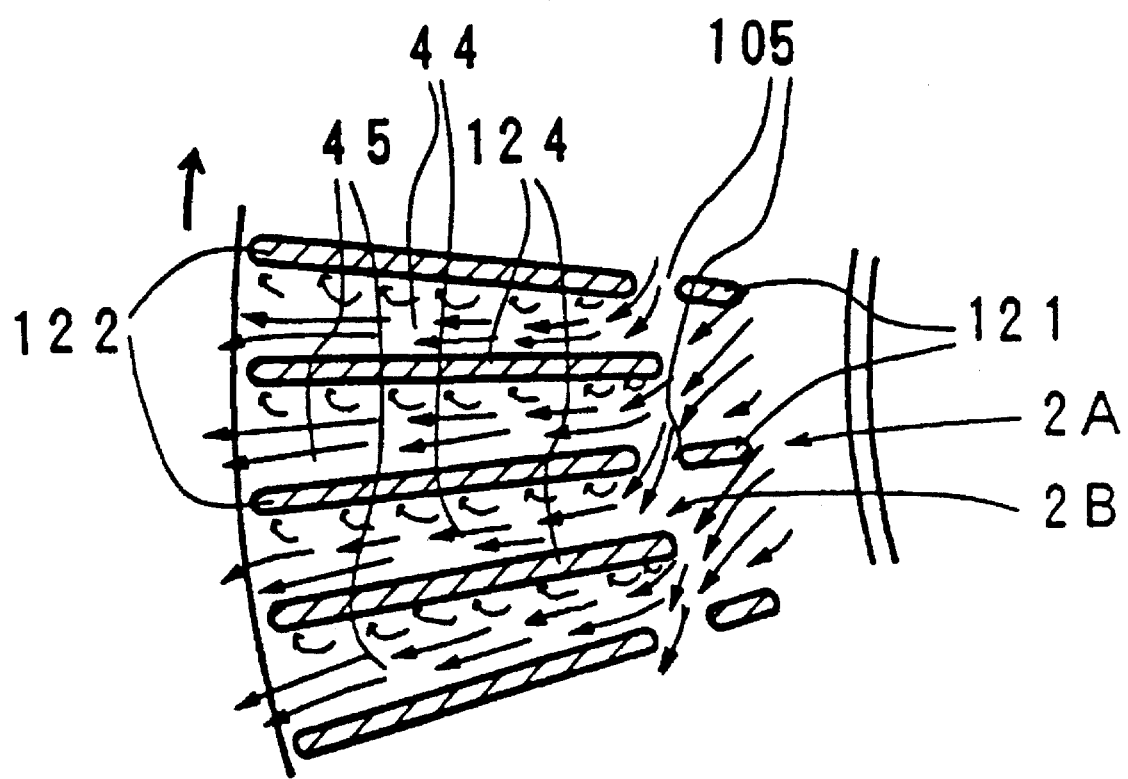
FIG. 35 is a fragmentary sectional view showing a brake disc rotor and a stream as a fifteenth preferred embodiment of the present invention.

A brake disc rotor of a fifteenth preferred embodiment of the present invention is constituted such that a so-called zigzag fin, which forms a first ventilation hole 44 and a second ventilation hole 45, is formed by alternately arranging first fins 2A formed with the connecting openings 105 and composed of inner fins 121 and outer fins 122, and second fins 2B formed with no connecting opening and composed of long fins 124 having the inner ends located close to the outer side from the ends of the first fins, as shown in FIG. 35. The installation pitch of the fins on the circumference is narrowed by increasing the number of sheets of fins in order to increase the quantity of heat dissipation. As a result, the brake disc rotor of the fifteenth preferred embodiment makes the present invention applicable even to the brake disc rotor which cannot be provided with any connecting opening, as well as to the case where the inner fins 121 of the fins are extremely short.

A brake disc rotor of a sixteenth preferred embodiment of the present invention is applied to a disc brake device for use in an automobile similarly to that of the first preferred embodiment, and details thereof will be described with reference to FIGS. 36 to 38. FIGS. 6, 8, 10 and 11 used for the explanation of the first preferred embodiment will be also used for the explanation of the sixteenth preferred embodiment, and the same portions are given the same symbols.

A brake disc rotor 1 as the sixteenth preferred embodiment comprises: sliding plates 11 and 12 on the inside and outside both provided in parallel to and separately from each other in the axial direction of an axle (not shown); a plurality of fins 2 composed of inner fins 221 and outer fins 222 inclined with respect to the radial direction of the disc rotor; a plurality of openings 31 and 32 opening inward and outward in the radial direction between the sliding plates 11 and 12; a plurality of ventilation holes 4 composed of passages 41 and 42 formed by the sliding plates 11 and 12 and the mutually adjacent inner and outer fins 221 and 222; connecting openings 205 formed between the inner and outer fins 221 and 222 which are arranged alternately, and for allowing the mutually adjacent ventilation holes to communicate to each other; an R-portion 61 constituting a chamfered portion on the end of the inner wall of the inside sliding plate; a direction converting portion 62 constituting a projection portion on the end of the outside sliding plate; and heat dissipating fins 7 arranged radially on the inner wall constituting each ventilation hole 4 of the inside and outside sliding plates.

The outside sliding plate 12 is provided integrally with a boss portion 14 having a hole for fixation through a step portion 13 together with the inside sliding plate 11, as shown in FIG. 6. The inside and outside plates 11 and 12 linearly increase in thickness according as both the sliding plates come outward in the radial direction to result in linearly reducing the height of the ventilation hole 4.

Figure 36:
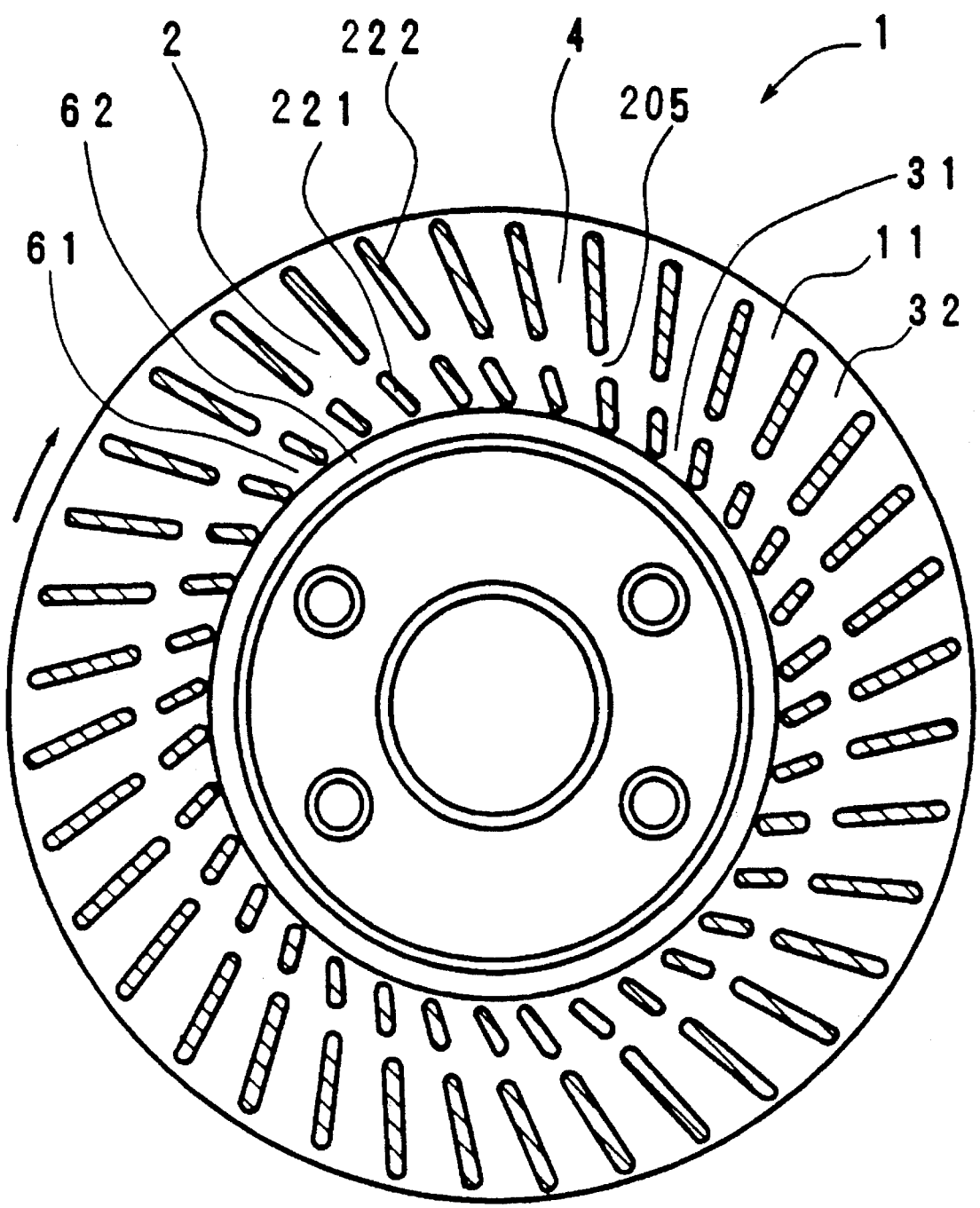
FIG. 36 is a cross-sectional view showing a brake disc rotor as a sixteenth preferred embodiment of the present invention.
Figure 37:
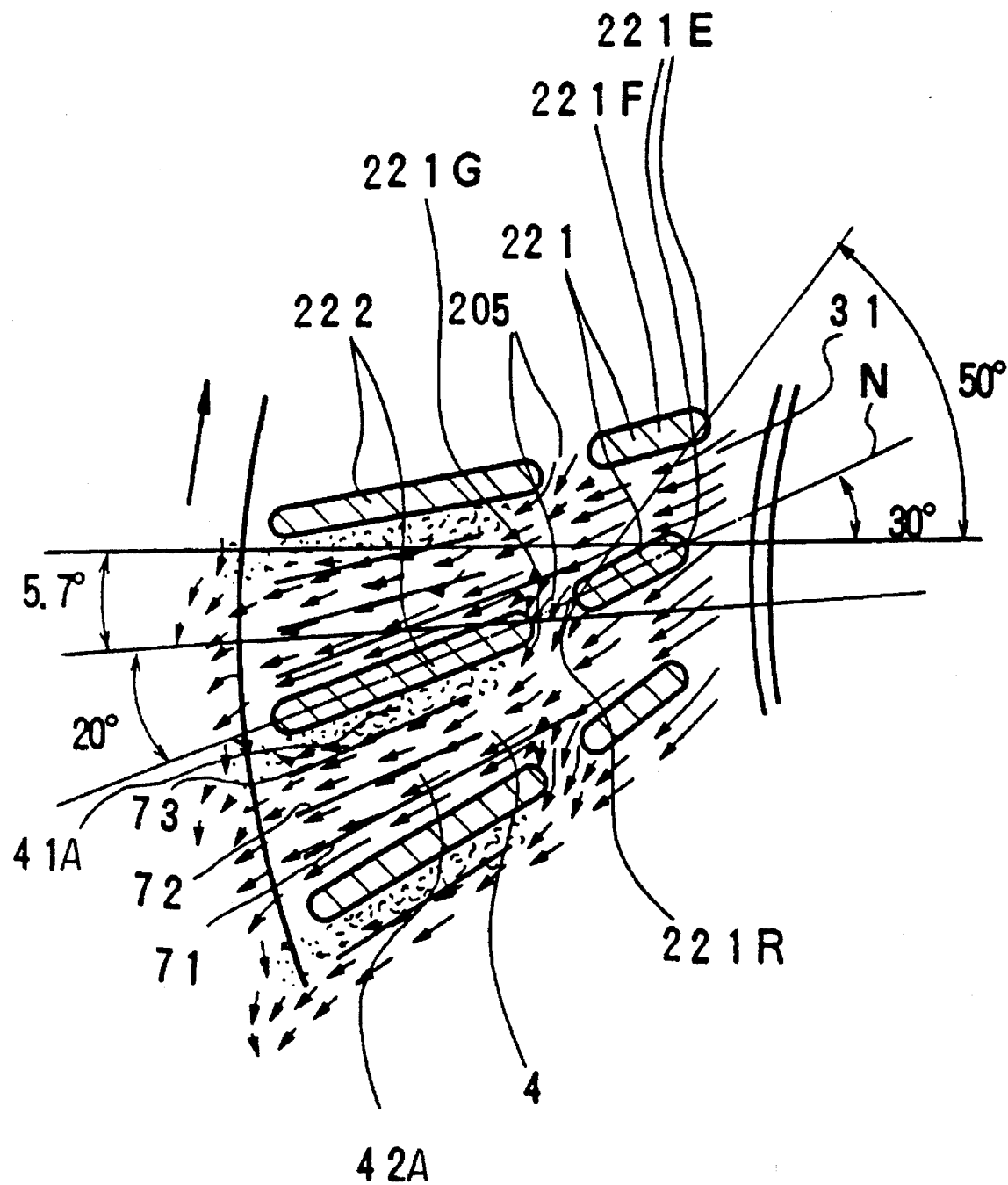
FIG. 37 is a fragmentary sectional view showing a stream within the brake disc rotor as the sixteenth preferred embodiment of the present invention.

As shown in FIGS. 36 and 37, the fins 2 are composed of the inner fins 221 and the outer fins 222, both of which are 4.5 mm in thickness, provided radially between the inside and outside sliding plates 11 and 12 in the range of 165 mm to 275 mm in diameter, inclined with respect to the the radial direction and integrally molded with the inside and outside sliding plates 11 and 12.

Namely, inner fins 221 corresponding to the inner partition walls are formed to be inclined at an angle of 30° relative to a straight line N connecting the end 221E of the inner fin 221 and the center (not shown) of a disc, and outer fins 222 corresponding to the outer partition walls are formed to be inclined at an angle smaller than the angle of 30° in the inlet portion, that is, the outer fins 222 are formed to be inclined at an angle of 20° relative to a straight line connecting the end 221G of the outer fin and the center of the disc, as shown in FIG. 37, so that the blade action on the pressure surface side of the outer fins 222 is effectively secured, which is a so-called two-stage fin structure.

Namely, the installation angle of the inner fins 221 and the outer fins 222 is determined in accordance with the inflow angle of the stream flowing into the rotor. Thus, since the stream generally flows into the rotor at the inflow angle in the range of 30° to 70°, the installation angle of the inner fins and outer fins is set accordingly equally to or slightly smaller than the inflow angle.

It is best that the installation angle of the inner fins 221 and the outer fins 222 of the fins 2 is set in accordance with the inflow angle of the stream, and in this case, the inflow loss is also made small. However, some undesirable areas are partially presented as a stream in case where the installation angle is small in a certain range with respect to the inflow angle of the stream, nevertheless the inflow loss is relatively small due to the expansion of the inlet sectional area, and such installation angle is effective when the number of sheets of fins is large (i.e., the interval between the fins is narrow). On the other hand, some undesirable area is partially presented as a stream even in case where the installation angle is large in a certain range with respect to the inflow angle of the stream, nevertheless the inflow loss is relatively small due to the expansion of the inlet sectional area, although the inflow loss in this case is increased more or less in comparison with that of the case where the inflow loss is small as described above. As a result, the installation angle of the fins 2 may be set in a certain range of angles in accordance with the inflow angle of the stream.

As shown in FIG. 6, the ventilation hole 4 is linearly enlarged according as the thickness of each of the inside and outside sliding plates 11 and 12 is increased outward in the radial direction, The height of the ventilation hole 4 is 14 mm at an inlet opening 31, and 9 mm at an outlet opening 32. Since the inner fins 221 and the outer fins 222 both constituting the fins 2 are formed radially in an alternate manner, the section area of each of the inner and outer ventilation passages 41 and 42 is made approximately uniform.

As shown in FIG. 37, the connecting opening 205 is 6.6 mm in length and divides the fin 2 into the inner fin 221, 15 mm in length and the outer fin 222, 34 mm in length. The connecting opening 205 is arranged such that a line connecting the end 221E of the inner fin 221 of the fin 2 on the upstream side of the stream and the end of the connecting opening 205 (i.e., the rear end 221R of the inner fin 221 of the fin 2) has an angle of approximately 50° relative to a neutral line N of the ventilation hole 4, namely the connecting opening 205 is formed at a position in the range of 0.28 L to 0.39 L (i.e., L represents the difference between the radius of the inner end of said inner partition wall and the radius of the outer end of said outer partition wall.

The permissible installation position of the connecting opening 205 is in the range of 0.1 L (i.e., 70° as the above-mentioned angle) to 0.7 L(30°), although it depends on the inflow angle of the stream into the ventilation hole 4. However, in the case where the installation position is too close to the inlet opening 31 (i.e., 0.1 L or less), the length of the inner partition wall 221 is short, and the stream flowing at an inflow angle of 40° through 50° directly passes through the connecting opening 205. As a result, some flow separation and the stagnation area Y are generated on the suction surface of the outer fin 222 in the ventilation hole on the adjacent downstream side, thereby enlarging the inflow loss at the inlet portion and decreasing the flow quantity, which leads to the lowering of cooling capacity.

On the other hand, in the case where the installation position of the connecting opening 205 is too close to the outlet opening 32 (i.e., 0.7 L or more), the generation of the flow separation on the outer side is controlled to lessen the stagnation area. However, since the pressure difference is decreased due to the loss resulting from the expansion of the ventilation hole 4, the pressure recovery effect is lessened, the flow separation is generated at the inlet portion, and the stagnation area is formed on the suction surface side of the inner fin, whereby flow quantity and cooling capacity are lowered. In the case where the installation position is apart by 0.5 L or more, the length of the outer fin becomes short. Accordingly, the difference between the inner energy and the outer energy of the hole for defining the blowing capacity of the ventilation hole becomes small, and the passing flow quantity has a tendency to decreasing. As a result, the limit of the installation position is set as 0.7 L from the standpoint of the balance between the installation position and the pressure recovery effect (i.e., effect to increase the flow quantity) caused by the connecting opening 205.

In the case where a sufficient cooling effect is required, it is preferable to make the installation position of the connecting opening 0.2 L to 0.5 L as a desirable range, although it depends on the installation interval and revolving speed of the fins. In the first preferred embodiment, the installation position of the connecting opening is set in the range of 0.24 L to 0.39 L.

The permissible length of the connecting opening 205 is in the range of 2 mm to 15 mm as a projected length described above. However, when the length of the connecting as opening is short, the effect of the connecting opening as a pressure recovery port is lowered. On the other hand, when the length thereof is long, the length of the fin becomes short, and thus the effect of the connecting opening as a blade (blowing fan) is lowered. As a result, the optimum length of the connecting opening is set in the range of 4 mm to 8 mm. In the sixteenth preferred embodiment, the length of the connecting opening is set as 6.6 mm in consideration of the viewpoint of manufacture.

The R-portion 61 at the end of the inner wall of the inside sliding plate 11 has a corner portion chamfered at an angle of 45°, as shown in FIG. 6, and the portion with the minimum thickness is set as 5 mm from the viewpoint of strength.

The direction converting portion 62 of the outside sliding plate 12 is projected inward in the radial direction from the inside sliding plate 11, and gradually increases in thickness according as the inner wall comes inward, to be formed into a concave arc-like shape which is curved up by 4 mm as shown in FIG. 6. As a result, the direction converting portion 62 transforms the stream in the axial direction of the rotor 1 into the stream outward in the radial direction, and allows the stream into the ventilation hole 4 through the inlet opening 31 in cooperation with the R-portion 61.

The fins 7 has long heat dissipating fins 71 and 74 radially integrated on a portion close to the outer partition wall 222 and short heat dissipating fins 72 and 73 radially integrated on a center portion of the ventilation hole 4, as shown in FIGS. 37 and 8, whereby the heat dissipation effect is enhanced without increasing the resistance of the stream within the ventilation hole 4.

The overall operation of the sixteenth preferred embodiment is as follows.

The brake disc rotor of the first preferred embodiment described above smoothly transforms the axial stream into the radial stream in cooperation with the R-portion 61 and the direction converting portion 62 in the inlet opening 31, as shown in FIG. 6, which allows the stream to flow into the ventilation hole 4 at the inflow angle of 30 through the inlet opening 31, as shown in FIG. 37, and allows the stream flowing along the wall surface on the pressure surface side of the inner partition wall 221 without the generation of the flow separation at the inlet opening 31 of the inner fin 221 to smoothly flow into the subsequent ventilation hole 4, through the connecting opening 205. As a result, the generation of the flow separation is controlled on the suction surface side of the outer fin 222 of the fins 2, and the stagnation area 41*a* is narrowed to form a wide main stream area 42*a*.

Figure 38:
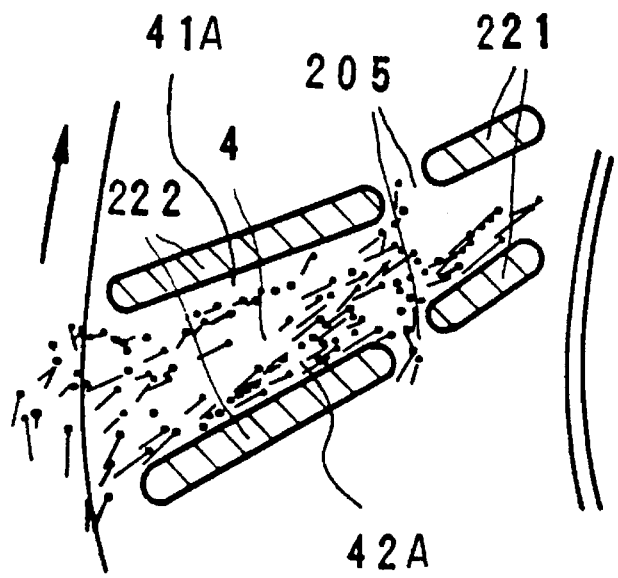
FIG. 38 is a fragmentary sectional view showing a stream within the brake disc rotor as the sixteenth preferred embodiment of the present invention by tracer particle process data.

This fact is apparent from FIG. 38 which shows sketch data of tracer particle process data by a styrene particle tracer method for making the stream visible that traces flowing styrene particles which follow the stream at the time. In this styrene tracer particle method, it is possible to obtain a velocity vector at a local place by determining each correspondence of the floating particle position continuously incorporated, and the results thus obtained well correspond to air-speed measurement data, and accordingly this is suitable to an observation of a main stream. The flow condition of the main stream area 42*a* and the region of the stagnation area 41*a* are clearly shown in FIG. 38.

In the brake disc rotor of the sixteenth preferred embodiment having the operation described above, as the smooth stream flowing along the inner and outer fins 221 and 222 is formed by the inner and outer fins 221 and 222 inclined with respect to the radial direction and the connecting opening 205, the generation of the stagnation area 41*a* is controlled by preventing the flow separation on the suction surface side of the outer fins 222 of the fins 2, and a wide main stream area 42*a* is formed in the most desirable form by controlling the generation of a prior art quasisecondary stream, so that the reverse stream produced in the outlet opening as in the case of the prior art can also be controlled. As a result, the brake disc rotor exerts such an effect as to improve the blowing and cooling efficiency of the rotor 1 and to increase the total quantity of heat dissipation for expanding the effective cooling area by minimizing the pressure loss of the stream and by lessening the lowering of the heat transfer coefficient by the surface of cooling wind.

Namely, the cooling capacity as a quantity of heat dissipation is expressed by a product of a heat dissipation area, a heat transfer coefficient and a temperature difference to one another, and in the case of a heat transfer by forced convection, the heat transfer coefficient is in proportion to the power of 0.5 through 0.8 of a flow rate. Therefore, the increase in flow rate is essential to the improvement of the cooling capacity. In other words, since the first preferred embodiment can decrease the passage resistance and increase the flow rate, the quantity of heat dissipation and the cooling capacity are improved by approximately 17%.

Further, since the cooling capacity is in proportion to the heat dissipation area, it is important to increase the cooling area. In the sixteenth preferred embodiment, since the cooling area is effectively secured within the limited cooling area to enlarge an area having high heat transfer coefficient, the cooling capacity can be enhanced remarkably.

Furthermore, since the axial stream is transformed smoothly into the radial stream in cooperation with the R-portion 61 and the direction converting portion 62 in the inlet opening 31, as shown in FIG. 6, the brake disc rotor 1 of the first preferred embodiment exerts such an effect as to effectively control the flow separation of the stream produced in the vicinity of the end of the inner wall of the inside sliding plate 11.

Since three pieces of small heat dissipating fins 71 through 73 are formed on the inner wall on the outer side of the inside and outside sliding plates, as shown in FIGS. 37 and 8, the brake disc rotor 1 of the sixteenth preferred embodiment exerts such an effect as to effectively enhance the heat dissipation effect without increasing the resistance of the stream within the ventilation hole 4.

Since the length of the connecting opening 205 is set as 6.6 mm as the optimum length, the brake disc rotor 1 of the first preferred embodiment exerts such an effect as to most effectively control the stagnation area due to the flow separation on the suction surface side of the fins 2 by the stream passing through the connecting opening 205.

Moreover, since the connecting opening 205 is arranged at a position in the range of 0.28 L (i.e., 50° as the above-mentioned angle) to 0.39 L as the most appropriate position, the brake disc rotor 1 of the sixteenth preferred embodiment exerts such an effect as to most effectively control the stagnation area due to the flow separation.

A brake disc rotor of a seventeenth preferred embodiment of the present invention is constituted such that the shape of the fins and the connecting openings are particularly changed in order to more effectively control the generation of any stagnation area by preventing the flow separation of the stream on the suction surface side of the fins 2, from the standpoint of emphasizing on the improvement of the stream within the ventilation hole 4.

Figure 39:
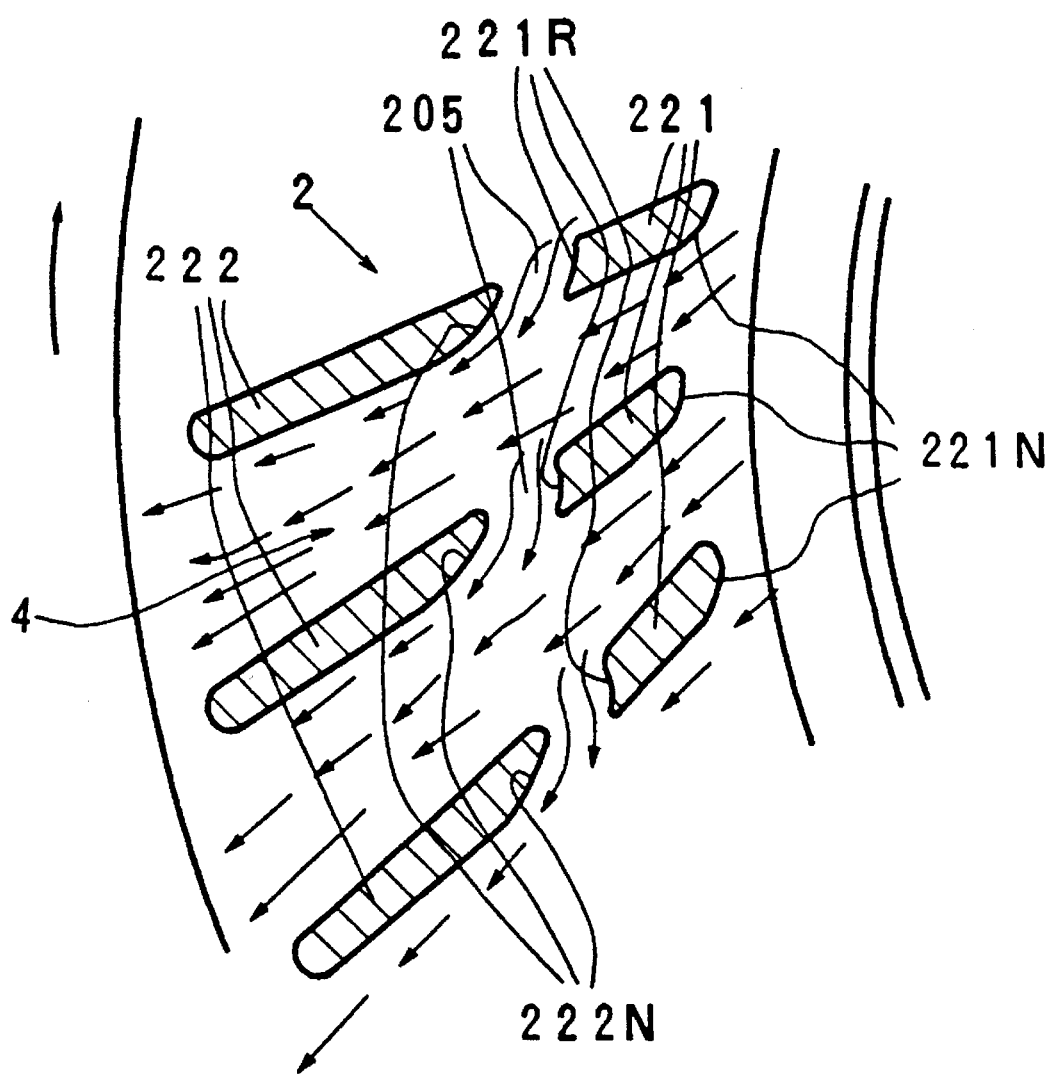
FIG. 39 is a fragmentary sectional view showing a brake disc rotor and a stream as a seventeenth preferred embodiment of the present invention.

As shown in FIG. 39, the ends 221N and 222N of the inner fins 221 and the outer fins 222 of the fins 2 on the suction surface side are formed into a streamline shape where the ends 221N and 222N gradually increase in thickness, so that the stream flows along the suction surface 221N and 222N of the fins 2. The rear ends 221R of the inner fins 221 constituting connecting openings 205 are formed into a S-letter shape, so that the stream along the rear ends 221R is allowed to direct to and flow along the suction surfaces 222N of the outer fins 222. The installation position of the connecting opening 205 is set in the range of approximately 0.3 L to 0.5 L from the inner end of the fin 2, and the length of the connecting opening 205 is set as approximately 7 mm.

In the brake disc rotor of the seventeenth preferred embodiment having the constitution described above, since the stream flowing into the ventilation hole 4 flows along the streamlined ends 221N of the inner fins 221 on the suction surface side as shown in FIG. 39, the flow separation of the stream and the stagnation area are further controlled in comparison with those in the first preferred embodiment, and the stream passing through the connecting openings 205 smoothly flows along the suction surfaces 222N of the outer fins 222 of the fins 2 by the S-letter shape of the rear end 221 of the inner fin 222 and the streamline shape of the suction surface 222N of the outer fin 222. As a result, the brake disc rotor of the seventeenth preferred embodiment exerts such an effects as to control the stagnation by more effectively preventing the generation of the flow separation at the lower portion of the suction surfaces of the outer fins 222 of the fins 2 in comparison with that in the sixteenth preferred embodiment.

Figure 40:
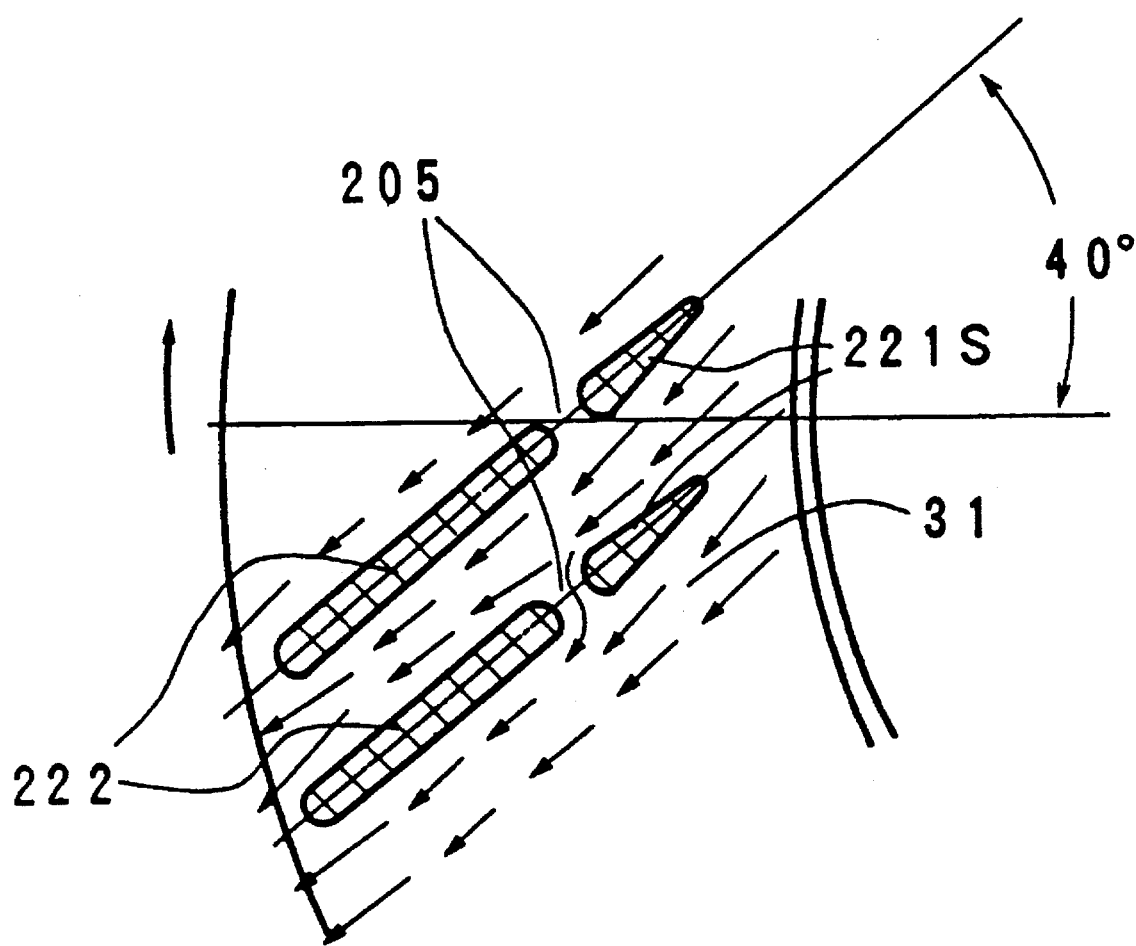
FIG. 40 is a fragmentary sectional view showing a brake disc rotor and a stream as an eighteenth preferred embodiment of the present invention.

A brake disc rotor of an eighteenth preferred embodiment of the present invention is constituted such that the installation angle of the inner fins 221 of the fins in the sixteenth preferred embodiment is increased up to 40°, the inner fins 221 are changed into thin inner fins 221S gradually increasing in thickness, and the inner fins 221S and outer fins 222 are arranged on a straight line by setting the installation angle of the outer fins 222 as 40° which is equal to that of the inner fins 221S, as shown in FIG. 40. Accordingly, the brake disc rotor of the eighteenth preferred embodiment makes the stream within the ventilation hole further uniform by preventing more effectively the flow separation of the stream, enlarges the area of the inlet opening 31 to improve the connection between the inner fins 221S and the outer fins 222, and further improves the blowing and cooling efficiency by lessening the inflow resistance.

The brake disc rotor of the eighteenth preferred embodiment is particularly effective in case of increasing the number of sheets of fins, since the outer side portion has a higher pressure in case of a floating caliper, and thus, the thick outer fins 222 of the fins are sufficient to get satisfactory strength.

The preceding preferred embodiments are illustrated for depicting the relation in angle between the inner partition walls and the outer partition walls. However, the present invention is not restricted to those described above, and any other arbitrary angle relations may be applicable in accordance with the inflow angle of the stream and other conditions.

The preferred embodiment has been described with respect to the case where the installation position of the connecting opening is set in the range of 0.24 L to 0.38 L (i.e., L represents the difference between the radius of the inner end of said inner partition wall and the radius of the outer end of said outer partition wall), namely, when the installation position is expressed by the angle, the connecting opening is installed at an angle of 50° between the neutral line of the ventilation hole and the line connecting the end of the precedent fin in the rotary direction and the rear end of the inlet portion of the fin. However, the installation angle of the connecting opening may be set in the range of 0.1 L to 0.7 L, or at the angle described above in the range of 30° to 70° depending on the length of the fins, the width of the ventilation hole, the rotating speed of the rotor and any other necessities.

The length of the connecting opening is set in the range of 2 mm to 15 mm as a permissible range as in the rotor size in the first preferred embodiment, and preferably in the range of 4 mm to 6 mm. However, the connecting opening may be set longer according as the rotor size becomes large. Since the length of the connecting opening is totally determined from the standpoint of the flow rate of the stream passing through the connecting opening, the blade action of the fins and so forth, the connecting opening may be set as an appropriate length in the range of 0.1 L to 0.2 L with respect to the length L of the fins.

The preferred embodiment has been described with respect to the case where the padding height of the direction converting portion of the inlet opening is 4 mm. However, it may be possible to apply any appropriate length of 5 mm or less for the rotor size in the first preferred embodiment, from the standpoint of the inflow resistances, and defective production or any other points on manufacture. If the rotor size becomes larger, the direction converting portion may be set as 5 mm or more in padding height.

The heat dissipating fins are 1 mm in height in the first preferred embodiment described above. However, it may be possible to set as any arbitrary height of 3 mm or less, if the area of the ventilation hole is similar to that in the first preferred embodiment. If the area of the ventilation hole becomes larger, the height of the heat dissipating fins may be set as an appropriate height corresponding to 30% or less of the height of the ventilation hole.

What is claimed is:

1. A brake disc rotor, comprising:

at least two disc-shaped sliding plates separately provided in the axle direction on the inside and outside of said brake disc rotor;

a plurality of inner and outer partition walls comprising straight walls arranged at a predetermined angle with respect to the radial direction thereof between said sliding plates, wherein said inner walls are respectively positioned radially upward from said outer walls and entirely positioned in a region located between the extensions of longitudinal axes, respectively, of said adjacent outer walls, and wherein at least one of said inner and outer partition walls have a sufficient length as compared with a thickness thereof so as to form streams of air along the walls thereof;

a plurality of passages radially formed between said plurality of inner and outer partition walls;

a plurality of inlet and outlet openings respectively provided in the inner and outer walls of the rotor, communicating to a plurality of inner and outer passages and opening inward and outward in the radial direction; and a plurality of connecting openings allowing the mutually adjacent passages to communicate with each other between the inner and outer partition walls wherein the streams flowing along said inner partition walls partially flow into the mutually adjacent passages on the downstream sides through said connecting openings;

wherein said inner partition walls are arranged inward from said connecting openings such that the stream flowing from said inlet opening flows along said inner partition walls; and said outer partition walls are arranged such that the streams flowing along said inner partition walls partially flow into the mutually adjacent passages on the downstream sides through connecting openings to form the streams in flow separation portions in the vicinity of one of lower and upper walls of said outer partition walls so as to reduce the flow separations on at least outer partition walls of the streams from the inlet openings by the streams passing through the connecting openings.

2. A brake disc rotor according to claim 1, wherein said inner partition wall has enough length to be brought into contact with the stream flowing from said inlet opening so as to form the stream flowing along the upper wall, and allows the stream passing through said connecting opening to form the stream flowing along the lower wall of said outer partition wall.

3. A brake disc rotor according to claim 1, wherein the length of said inner partition wall is determined in accordance with an inflow angle of the stream flowing from said inlet opening.

4. A brake disc rotor according to claim 1, wherein the outer end of said inner partition wall is arranged on an outer radial side from said inlet opening by a length determined by a ratio w/tanα of a width W of said inlet opening to an inflow angle α of the stream flowing from said inlet opening.

5. A brake disc rotor according to claim 1, wherein said connecting opening is formed at the position on an outer radial side from said inlet opening by a length determined by a ratio w/tanα of a width W of said inlet opening to an inflow angle α of the stream flowing from said inlet opening.

6. A brake disc rotor according to claim 1, wherein said connecting opening is formed in the range of 0.2 L to 0.7 L from the inner end of said inner partition wall, when the difference between the radius of the inner end of said inner partition wall and the radius of the outer end of said outer partition wall is defined as L.

7. A brake disc rotor according to claim 1, wherein said inner partition wall is arranged between the mutually adjacent outer partition walls.

8. A brake disc rotor according to claim 7, wherein the outer end of said inner partition wall is close to the outer side from the inner end of said outer partition wall.

9. A brake disc rotor according to claim 8, wherein said connecting opening is formed in the range of 0.1 L to 0.7 L from the inner end of said inner partition wall, when the difference between the radius of the inner end of said inner partition wall and the radius of the outer end of said outer partition wall is defined as L.

10. A brake disc rotor according to claim 7, wherein the number of said inner partition walls is different from that of said outer partition walls.

11. A brake disc rotor according to claim 7, wherein either of said inner and outer partition walls is arranged at the symmetrical position relative to the other adjacent partition wall.

12. A brake disc rotor according to claim 7, wherein said inner partition wall is inclined at an angle larger than the inflow angle of the stream.

13. A brake disc rotor, according to claim 1, wherein said inner and outer partition walls are formed along a straight line.

14. A brake disc rotor according to claim 13, wherein said inner and outer partition walls are arranged in the radial direction of the disc rotor.

15. A brake disc rotor according to claim 14, wherein the inner wall end of said inside disc-shaped sliding plate constituting said inlet opening is provided with a chamfered portion gradually decreasing in thickness as said inside disc-shaped sliding plate approaches to the end thereof, and the end of said outside disc-shaped sliding plate constituting said inlet opening is projected inward in the radial direction from said inside disc-shaped sliding plate, while being provided with a projection portion gradually increasing in thickness according as said outside disc-shaped sliding plate comes closer to the end thereof.

16. A brake disc rotor according to claim 14, wherein heat dissipating fins composed of small projections having small width and height are formed radially at least on the outer portion of the inner wall constituting the passages of said outside and inside disc-shaped sliding plate.

17. A brake disc rotor according to claim 14, wherein the ends of said inner and outer partition walls on the suction surface side are formed with a streamlined shape.

18. A brake disc rotor according to claim 17, wherein the rear end of said inner partition wall is formed with an an edge having convex and concave edge portions.

19. A brake disc rotor according to claim 14, wherein an intermediate partition wall is additionally provided between said inner and outer partition walls.

20. A brake disc rotor according to claim 14, wherein the thickness of said inner partition wall is smaller than that of said outer partition wall.

21. A brake disc rotor according to claim 14, wherein an additional outer partition wall is arranged radially between the mutually adjacent outer partition walls.

22. A brake disc rotor according to claim 13, wherein said inner partition wall is inclined at an angle smaller than the inflow angle of the stream with respect to the radial direction of the disc rotor.

23. A brake disc rotor according to claim 22, wherein said outer partition wall is arranged to be inclined at an angle smaller than the inflow angle of the stream in the radial direction of the disc rotor.

24. A brake disc rotor according to claim 13, wherein said rotor partition wall is inclined rearward with respect to a rotational direction of the rotor.

25. A brake disc rotor according to claim 22, wherein the ends of said inner and outer partition walls are of a streamlined shape.

26. A brake disc rotor according to claim 22, wherein the rear end of said inner partition wall is formed with an edge having convex and concave edge portions.

27. A brake disc rotor according to claim 22, wherein said inner partition wall is gradually increased in thickness from the end to the rear end thereof.

28. A brake disc rotor according to claim 1, wherein an angle with respect to a radial direction of the outer partition walls is not larger than that with respect to a radial direction of the inner partition walls.

29. A brake disc rotor according to claim 28, wherein a difference between the angles of said inner and outer partition walls is such that said inner partition wall is positioned in said region defined by the two extended longitudinal axes of said adjacent outer partition walls.

30. A brake disc rotor according to claim 1, wherein an angle between said inner partition wall and said adjacent outer partition wall to said inner partition wall is smaller than that between said adjacent outer partition walls.

31. A brake disc rotor according to claim 1, wherein said connecting openings have a width dimension in the range of 0.1 L to 0.2 L with respect to the total length L of said inner and outer partition walls.

32. A brake disc rotor, comprising:

at least two disc-shaped sliding plates separately provided in the axle direction on the inside and outside of the brake disc rotor;

a plurality of inner and outer partition walls comprising straight walls arranged between said sliding plates, wherein said inner walls are respectively positioned radially inward from said outer walls and entirely positioned in a region located between extensions of two longitudinal axes, respectively, of said adjacent outer walls, and wherein at least one of said inner and outer partition walls have a sufficient length as compared with a thickness thereof so as to form streams of air along the walls thereof;

a plurality of passage radially formed between said plurality of inner and outer partition walls;

a plurality of inlet and outlet openings respectively provided in the inner and outer walls of the rotor, communicating to a plurality of inner and outer passages and opening inward and outward in a radial direction; and a plurality of connecting openings allowing the mutually adjacent passages to communicate with each other between the inner and outer partition walls wherein the stream flowing along said inner partition walls partially flow into the mutually adjacent passages on the downstream sides through said connecting openings;

wherein said inner partition walls are arranged inward from said connecting openings such that the stream flowing from said inlet opening flows along said inner partition walls;

said outer partition walls are arranged such that the streams flowing along said inner partition walls partially flow into the mutually adjacent passages on the downstream sides through connecting openings to form the streams in flow separation portions in the vicinity of one of lower and upper walls of said outer partition walls so as to reduce the flow separations on at least outer partition walls of the stream from the inlet opening by the streams passing through the connecting openings; and wherein the installation angle of said inner partition wall is different from that of said outer partition wall.

33. A brake disc rotor, which comprises:

at least two disc-shaped sliding plates separately provided in the axle direction on the inside and outside of said brake disc rotor;

a plurality of inner and outer partition walls radially arranged at substantially the same angles with respect to the radial direction thereof between said sliding plates wherein said inner walls are positioned radially inward from said outer walls and entirely positioned in a region defined by the respective extended longitudinal axes of said adjacent outer walls and a radially outer end portion of said inner partition walls is positioned at a radially inner side from a radially inner end portion of said outer partition wall;

wherein at least one of said inner partition walls and outer partition walls have a sufficient length as compared with the thickness thereof so as to form a stream of air along the wall thereof during rotation of the disc rotor at operating speeds;

a plurality of passages radially formed between said plurality of inner and outer partition walls;

a plurality of inlet and outlet openings respectively provided in the inner and outer walls of the rotor, said inlet and outlet openings communicating with a plurality of inner and outer passages and opening inward and outward in the radial direction; and a plurality of connecting openings allowing the mutually adjacent passages to communicate with each other between the inner and outer partition walls wherein the width of said connecting openings is narrower than those of the inner and outer partition walls;

wherein said inner partition walls are arranged inward from said connecting openings such that the stream flowing from said inlet opening is allowed to flow along the inner partition walls; and said outer partition walls are arranged such that the streams flowing along said inner partition walls partially flow into the mutually adjacent passages on the downstream sides through said connecting openings to form the streams in a flow separation portion in the vicinity of one of lower and upper walls such that flow separations on at least one of the inner and outer partition walls of the stream from the inlet opening are substantially prevented by the streams passing through the connecting openings.

34. A brake disc rotor, comprising:

at least two disc-shaped sliding plates separately provided in the axle direction on the inside and outside of said brake disc rotor;

a plurality of inner and outer partition walls comprising straight walls arranged at substantially the same angle with respect to the radial direction thereof between said sliding plates, wherein said inner walls are shorter than said outer walls and are respectively positioned radially inward from said outer wall in a region defined by two extended neutral lines of said adjacent outer walls, and wherein said inner and outer partition walls have sufficient length as compared with the thickness thereof so as to form streams of air along the walls thereof;

a plurality of passages radially formed between said plurality of inner and outer partition walls;

a plurality of inlet and outlet openings respectively provided in the inner and outer walls of the rotor, communicating to a plurality of inner and outer passages and opening inward and outward in the radial direction; and a plurality of connecting openings allowing the mutually adjacent passages to communicate with each other between the inner and outer partition walls wherein the streams flowing along said inner partition walls partially flow into the mutually adjacent passages on the downstream sides through said connecting openings;

wherein said inner partition walls are arranged inward from said connecting openings such that a stream flowing from said inlet opening is allowed to flow along said inner partition walls; and wherein said outer partition walls are arranged such that the streams flowing along said inner partition walls are allowed to partially flow into the mutually adjacent passages on the downstream sides through connecting openings to form the streams in flow separation portions in the vicinity of one of lower and upper walls of said outer partition walls so as to reduce the flow separations of at least outer partition walls of the streams from the inlet openings by the streams passing through the connecting openings.

35. A brake disc rotor, comprising:

at least two disc-shaped sliding plates separately provided in the axle direction on an inside and outside portion of said brake disc rotor;

a plurality of inner and outer partition walls comprising straight walls arranged at substantially the same angle with respect to a radial direction thereof between said sliding plates so that said inner walls are respectively positioned radially inward from said outer walls and entirely positioned in a region located between the extended longitudinal axes of said adjacent outer walls, and wherein at least one of inner and outer partition walls have a sufficient length dimension as compared with a thickness dimension thereof so as to form streams of air along the walls thereof;

a plurality of passages radially formed between said plurality of inner and outer partition walls;

a plurality of inlet and outlet openings respectively provided in the inner and outer walls of the rotor, communicating with a plurality of inner and outer passages and opening inward and outward in the radial direction; and a plurality of connecting openings allowing the mutually adjacent passages to communicate with each other between the inner and outer partition walls wherein the streams flowing along said inner partition walls partially flow into the mutually adjacent passages on the downstream sides through said connecting openings;

wherein said inner partition walls are arranged inward from said connecting openings such that the stream flowing from said inlet opening is allowed to flow along said inner partition walls and said outer partition walls are arranged such that the streams flowing along said inner partition walls are allowed to partially flow into the mutually adjacent passages on the downstream sides through connecting openings to form the streams in flow separation portions in the vicinity of one of lower and upper walls of said outer partition walls so as to reduce the flow separations on at least outer partition walls of the streams from the inlet openings by the streams passing through the connecting openings.

36. A brake disc rotor, comprising:

at least two disc-shaped sliding plates separately provided in the axle direction on the inside and outside of said brake disc rotor;

a plurality of inner and outer partition walls comprising straight walls arranged at different angles with respect to the radial direction thereof between said sliding plates, wherein said inner walls are respectively positioned radially inward from said outer walls and partitioned entirely in a region located between the extended longitudinal axes of said adjacent outer walls, and wherein at least one of inner and outer partition walls have a sufficient length dimension as compared with a thickness dimension thereof so as to form streams of air along the walls thereof;

a plurality of passages radially formed between said plurality of inner and outer partition walls;

a plurality of inlet and outlet openings respectively provided in the inner and outer walls of the rotor, communicating to a plurality of inner and outer passages and opening inward and outward in the radial direction; and a plurality of connecting openings allowing the mutually adjacent passages to communicate with each other between the inner and outer partition walls wherein the streams flowing along said inner partition walls partially flow into the mutually adjacent passages on the downstream sides through said connecting openings;

wherein said inner partition walls are arranged radially inward with respect to said connecting openings such that the stream flowing from said inlet opening flows along said inner partition walls; and said outer partition walls are relatively inclined rearward in a direction of rotation with respect to said inner partition walls and wherein said outer partition walls are arranged such that the streams flowing along said inner partition walls partially flow into the mutually adjacent passages on the downstream sides through connecting openings to form the streams in flow separation portions in the vicinity of one of lower and upper walls of said outer partition walls so as to reduce the flow separations on at least outer partition walls of the streams from the inlet openings by the streams passing through the connecting openings.

\* \* \* \* \*